US008892287B2

(12) United States Patent
Takeuchi et al.

(10) Patent No.: US 8,892,287 B2
(45) Date of Patent: Nov. 18, 2014

(54) HYBRID VEHICLE CONTROL UNIT AND CONTROL METHOD

(75) Inventors: Masahiro Takeuchi, Saitama (JP); Takefumi Ikegami, Saitama (JP); Shigetaka Kuroda, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/700,304

(22) PCT Filed: Jul. 12, 2011

(86) PCT No.: PCT/JP2011/065904
§ 371 (c)(1),
(2), (4) Date: Nov. 27, 2012

(87) PCT Pub. No.: WO2012/008461
PCT Pub. Date: Jan. 19, 2012

(65) Prior Publication Data
US 2013/0103242 A1   Apr. 25, 2013

(30) Foreign Application Priority Data
Jul. 12, 2010 (JP) ................. 2010-157984

(51) Int. Cl.
*B60W 20/00* (2006.01)
*B60W 10/10* (2012.01)
(Continued)

(52) U.S. Cl.
CPC ............. *B60W 20/106* (2013.01); *B60L 11/14* (2013.01); *B60L 2220/14* (2013.01);
(Continued)

(58) Field of Classification Search
CPC ............ B60K 6/36; B60K 6/48; B60K 6/485; B60K 6/26; B60K 6/543; B60K 6/10; B60K 6/20; B60K 6/42; F16H 55/36; F16H 3/006; F16D 41/088; B60W 10/06
USPC ........ 701/22; 74/329; 180/65.22, 165; 477/3, 477/5; 474/171; 361/146; 192/84.9
See application file for complete search history.

(56) References Cited

U.S. PATENT DOCUMENTS 6,499,370 B2 * 12/2002 Bowen ........................... 74/330
7,836,986 B1 * 11/2010 Gillecriosd ................. 180/65.21
(Continued)

FOREIGN PATENT DOCUMENTS

CN   101244693 A   8/2008
CN   101578191 A   11/2009
(Continued)

OTHER PUBLICATIONS

Machine Translation of Japanese Patent 3647399 B; Marunouchi, Chiyoda-ku; Feb. 8, 2005.*

(Continued)

*Primary Examiner* — Tuan C. To
*Assistant Examiner* — Yuri Kan
(74) *Attorney, Agent, or Firm* — Westerman, Hattori, Daniels & Adrian, LLP

(57) ABSTRACT

With a hybrid vehicle driven at extremely low speeds only by power from the electric motor, when a state-of-charge of the battery becomes equal to or smaller than a predetermined level or when a rotational speed required on the air conditioner compressor is less than a desired rotational speed, power from the internal combustion engine is transmitted to the output shaft by engaging the first engaging and disengaging mechanism, starting the internal combustion engine by power from the electric motor, and thereafter, engaging the first engaging and disengaging mechanism or the second engaging and disengaging mechanism between a fully applied state and a fully released state.

28 Claims, 12 Drawing Sheets

(51) Int. Cl.
| | |
|---|---|
| *B60W 10/08* | (2006.01) |
| *B60W 10/06* | (2006.01) |
| *B60W 10/02* | (2006.01) |
| *B60L 11/14* | (2006.01) |
| *B60W 30/186* | (2012.01) |
| *B60W 30/18* | (2012.01) |
| *B60W 10/30* | (2006.01) |
| *B60L 11/12* | (2006.01) |
| *B60L 11/00* | (2006.01) |
| *B60W 10/115* | (2012.01) |
| *B60H 1/32* | (2006.01) |
| *B60H 1/00* | (2006.01) |
| *B60W 10/113* | (2012.01) |
| *B60K 6/36* | (2007.10) |
| *B60L 1/00* | (2006.01) |
| *B60L 7/14* | (2006.01) |
| *B60K 6/48* | (2007.10) |

(52) U.S. Cl.
CPC ......... *Y02T 10/6217* (2013.01); *B60W 2600/00* (2013.01); *B60L 2210/40* (2013.01); *B60W 30/186* (2013.01); *B60W 10/06* (2013.01); *Y02T 10/7077* (2013.01); *B60L 2240/507* (2013.01); *B60K 2006/4816* (2013.01); *B60K 6/48* (2013.01); *B60L 2240/441* (2013.01); *B60L 2220/16* (2013.01); *B60W 10/10* (2013.01); *B60L 2250/10* (2013.01); *B60W 30/18063* (2013.01); *B60W 2510/244* (2013.01); *B60W 10/30* (2013.01); *B60L 11/123* (2013.01); *Y02T 10/642* (2013.01); *B60L 2240/421* (2013.01); *Y02T 10/7241* (2013.01); *Y02T 10/7005* (2013.01); *B60L 2240/12* (2013.01); *B60L 11/005* (2013.01); *B60W 10/115* (2013.01); *Y02T 10/6286* (2013.01); *B60H 1/3222* (2013.01); *Y02T 10/7022* (2013.01); *B60H 1/004* (2013.01); *B60W 10/113* (2013.01); *B60W 20/00* (2013.01); *Y02T 10/6221* (2013.01); *B60K 6/36* (2013.01); *Y02T 10/6256* (2013.01); *B60L 1/003* (2013.01); *B60W 10/02* (2013.01); *B60W 10/08* (2013.01); *B60L 2240/36* (2013.01); *B60L 7/14* (2013.01); *B60W 2510/0291* (2013.01); *Y10S 903/93* (2013.01)
USPC .................. 701/22; 180/65.265; 903/930

(56) References Cited

U.S. PATENT DOCUMENTS

| | | | |
|---|---|---|---|
| 8,506,450 B2* | 8/2013 | Nakasako ................ | 477/5 |
| 8,544,575 B1* | 10/2013 | Scaringe et al. ........... | 180/65.22 |
| 2002/0033059 A1* | 3/2002 | Pels et al. ................. | 74/329 |
| 2005/0003926 A1* | 1/2005 | Hanada et al. ............ | 477/3 |
| 2007/0118255 A1* | 5/2007 | Wakashiro et al. ........ | 701/22 |
| 2007/0145749 A1* | 6/2007 | Holmes et al. ............ | 290/45 |
| 2007/0275808 A1* | 11/2007 | Iwanaka et al. ........... | 475/5 |
| 2008/0242498 A1* | 10/2008 | Miller et al. .............. | 477/5 |
| 2009/0255741 A1* | 10/2009 | Major et al. .............. | 180/65.22 |
| 2009/0291794 A1* | 11/2009 | Amanuma et al. ........ | 474/171 |
| 2010/0019048 A1* | 1/2010 | Flick ......................... | 236/51 |
| 2011/0198143 A1* | 8/2011 | Gravino .................... | 180/165 |
| 2013/0201591 A1* | 8/2013 | Dimig et al. .............. | 361/146 |

FOREIGN PATENT DOCUMENTS

| | | | | | |
|---|---|---|---|---|---|
| JP | 07-071492 | A | | 3/1995 | |
| JP | 11-082260 | A | | 3/1999 | |
| JP | 2002-089594 | | * | 3/2002 | ............ F16D 48/06 |
| JP | 2002-089594 | A | | 3/2002 | |
| JP | 2002-204504 | A | | 7/2002 | |
| JP | 2005-337416 | A | | 12/2005 | |
| JP | 2008-296907 | A | | 12/2008 | |
| JP | 2009-107502 | A | | 5/2009 | |
| JP | 3647399 | B | * | 3/2010 | ............ F16H 63/08 |
| JP | 2010-149629 | | * | 7/2010 | ............ B60K 6/48 |
| JP | 2010-149629 | A | | 7/2010 | |

OTHER PUBLICATIONS

Machine Translation of Japanese patent application publication 07-071492; Hiroshi, Tanaka; Mar. 17, 1995.*
Machine Translation of Japanese patent application publication 2010-149629; Jul. 8, 2010.*
International Search Report for PCT/JP2011/065904, mailing date of Sep. 27, 2011.
Office Action dated Apr. 8, 2014, issued in Russian Patent Application No. 2013101579, with English Translation (20 pages).
Chinese Office Action dated Jul. 29, 2014, issued in corresponding Chinese Patent Application No. 201180025576.8 (11 pages).

* cited by examiner

HYBRID VEHICLE CONTROL UNIT AND CONTROL METHOD

TECHNICAL FIELD

The present invention relates to a hybrid vehicle control unit and control method for switching driving forms of a hybrid vehicle to a driving form suitable for a state-of-charge of a battery when driving the hybrid vehicle at extremely low speeds.

BACKGROUND ART

When driven on a road congested with heavy traffic, a vehicle moves at low speeds or repeats stops and starts. Additionally, depending on the cause for traffic jam, or area, season or hours when a traffic jam takes place, vehicles move slowly in column on a congested road. When caught in such a traffic jam, vehicles tend to be driven on a congested road at extremely low speeds of 7 km/h or lower, for example. When a hybrid vehicle that can be driven by power from a motor in addition to power from an engine is driven at extremely low speeds, it is desirable that the hybrid vehicle runs on EV driving in which the hybrid vehicle is driven only by power from the motor that is driven by electric power supplied from a battery. This is because the motor can be driven in increments from a state where the revolution speed thereof is zero.

RELATED ART LITERATURE

Patent Literature

Patent Literature 1: JP-2009-107502-A

SUMMARY OF THE INVENTION

Problem that the Invention is to Solve

A motor is driven by electric power that is supplied from a battery. Because of this, when the state-of-charge of the battery drops to a certain level, a hybrid vehicle cannot continue the EV driving. As this occurs, in the hybrid vehicle, an engine is started so as to switch the driving form of the hybrid vehicle to an engine driving in which the hybrid vehicle is driven by power from the engine. However, in order for the engine to continue running without inadvertent stopping thereof (engine stall), the engine needs to continue rotating at a predetermined engine rotational speed or higher. However, the output of the engine that is driven at the predetermined engine rotational speed or higher is too large for the vehicle to be driven at extremely low speeds. Namely, when the output of the engine is transmitted to drive shafts as it is, the resulting vehicle speed exceeds a desired vehicle speed. Because of this, when the hybrid vehicle is driven at extremely low speeds by the power from the engine, the power that is transmitted to the drive shafts from the engine is reduced by engaging a clutch partially (Partial clutch engagement).

An object of the invention is to provide a hybrid vehicle control unit and control method for switching the driving form of a hybrid vehicle to a driving form that is suitable for a state-of-charge of a battery when the hybrid vehicle is driven at extremely low speeds.

Means for Solving the Problem

In accordance with an aspect of the invention, a control unit (e.g., a control unit 2 in embodiment) is provided for a hybrid vehicle having an internal combustion engine (e.g., an engine 6 in embodiment) and an electric motor (e.g., a motor 7 in embodiment) as drive sources, the hybrid vehicle including:

a first transmission mechanism (e.g., a planetary gear mechanism 30, a third speed drive gear 23a, a fifth speed drive gear 25a in embodiment) in which mechanical power from an engine output shaft of the internal combustion engine and the electric motor is borne by a first input shaft (e.g., a first main shaft 11 in embodiment) that engages with the electric motor and any one of a plurality of change-speed gears is engaged via a first synchronizing unit (e.g., a brake mechanism 61, a first gear shifter 51 in embodiment) so that the first input shaft is brought into engagement with driven wheels (e.g., driven wheels DW in embodiment) of the hybrid vehicle;

a second transmission mechanism (e.g., a second speed drive gear 22a, a fourth speed drive gear 24a in embodiment) in which mechanical power from the engine output shaft is borne by a second input shaft (e.g., a second intermediate shaft 16 in embodiment) and any of a plurality of change-speed gears is engaged via a second synchronizing unit (e.g., a second gear shifter 52 in embodiment) so that the second input shaft is brought into engagement with the driven wheels;

a first engaging and disengaging mechanism (e.g., a first clutch 41 in embodiment) that is provided so as to correspond to the first transmission mechanism for engaging the engine output shaft with the first input shaft;

a second engaging and disengaging mechanism (e.g., a second clutch 42 in embodiment) that is provided so as to correspond to the second transmission mechanism for engaging the engine output shaft with the second input shaft; and an air conditioner compressor (e.g., an air conditioner compressor 112 in embodiment) that is connected to the first input shaft via an air conditioner clutch (e.g., an air conditioner clutch 121 in embodiment) and which operates based on electric power from a battery (e.g., a battery 3 in embodiment) that supplies electric power to the electric motor, wherein the control unit controls the transmission so that with the hybrid vehicle driven at extremely low speeds only by power from the electric motor, when a state-of-charge of the battery becomes equal to or smaller than a first charged level or when a rotational speed required on the air conditioner compressor is less than a desired rotational speed, power from the internal combustion engine is transmitted to an output shaft by engaging the first engaging and disengaging mechanism, starting the internal combustion engine by power from the electric motor, and thereafter, engaging the first engaging and disengaging mechanism or the second engaging and disengaging mechanism between a fully applied state and a fully released state.

In accordance with an aspect of the invention, a control unit (e.g., a control unit 2 in embodiment) is provided for a hybrid vehicle having an internal combustion engine (e.g., an engine 6 in embodiment) and an electric motor (e.g., a motor 7 in embodiment) as drive sources, the hybrid vehicle including:

a first transmission mechanism (e.g., a planetary gear mechanism 30, a third speed drive gear 23a, a fifth speed drive gear 25a in embodiment) in which mechanical power from an engine output shaft of the internal combustion engine and the electric motor is borne by a first input shaft (e.g., a first main shaft 11 in embodiment) that engages with the electric motor and any one of a plurality of change-speed gears is engaged via a first synchronizing unit (e.g., a brake mechanism 61, a first gear shifter 51 in embodiment) so that the first input shaft is brought into engagement with driven wheels (e.g., driven wheels DW in embodiment) of the hybrid vehicle;

a second transmission mechanism (e.g., a second speed drive gear 22a, a fourth speed drive gear 24a in embodiment) in which mechanical power from the engine output shaft is borne by a second input shaft (e.g., a second intermediate shaft 16 in embodiment) and any of a plurality of change-speed gears is engaged via a second synchronizing unit (e.g., a second gear shifter 52 in embodiment) so that the second input shaft is brought into engagement with the driven wheels;

a first engaging and disengaging mechanism (e.g., a first clutch 41 in embodiment) that is provided so as to correspond to the first transmission mechanism for engaging the engine output shaft with the first input shaft;

a second engaging and disengaging mechanism (e.g., a second clutch 42 in embodiment) that is provided so as to correspond to the second transmission mechanism for engaging the engine output shaft with the second input shaft; and an air conditioner compressor (e.g., an air conditioner compressor 112 in embodiment) that is connected to the first input shaft via an air conditioner clutch (e.g., an air conditioner clutch 121 in embodiment), wherein the control unit controls the transmission so that with the hybrid vehicle driven at extremely low speeds only by power from the electric motor, when a state-of-charge of a battery (e.g., the battery 3 in embodiment) that supplies electric power to the electric motor becomes equal to or smaller than a first charged level or when a rotational speed required on the air conditioner compressor is less than a desired rotational speed, power from the internal combustion engine is transmitted to an output shaft by engaging the first engaging and disengaging mechanism, starting the internal combustion engine by power from the electric motor, and thereafter, engaging the first engaging and disengaging mechanism or the second engaging and disengaging mechanism between a fully applied state and a fully released state.

In accordance with an aspect of the control unit according to the invention, wherein, when the hybrid vehicle is driven at extremely low speeds by power from the internal combustion engine, an engagement state of the first engaging and disengaging mechanism or the second engaging and disengaging mechanism between the fully applied state and the fully released state is determined according to a deviation between an output of the internal combustion engine and an output that is required on a driven part.

In accordance with an aspect of the control unit of the invention, wherein, when the state-of-charge of the battery becomes equal to or smaller than a second charged level which is lower than the first charged level, power from the internal combustion engine is transmitted to the output shaft via the second synchronizing unit by engaging the second engaging and disengaging mechanism between the fully applied state and the fully released state, releasing the first synchronizing unit, and engaging the first engaging and disengaging mechanism.

In accordance with an aspect of the control unit of the invention, wherein, when a temperature of the second engaging and disengaging mechanism exceeds a threshold, power from the internal combustion engine is transmitted to the output shaft via the first synchronizing unit by engaging the first engaging and disengaging mechanism between the fully applied state and the fully released state, and disengaging the second engaging and disengaging mechanism.

In accordance with an aspect of the control unit of the invention, wherein, when a temperature of the second engaging and disengaging mechanism exceeds the threshold, a cooling control is executed to reduce the temperature of the second engaging and disengaging mechanism.

In accordance with an aspect of the control unit of the invention, wherein, in the cooling control, information is given to the driver of the hybrid vehicle.

In accordance with an aspect of the control unit of the present invention, wherein, in the cooling control, the second engaging and disengaging mechanism is made close to the fully released state, and the control unit is driven when the hybrid vehicle stops driving.

In accordance with an aspect of the control unit of the invention, wherein, when the hybrid vehicle is creeping, a vehicle speed is set such that the internal combustion engine can be started by power of the electric motor when a driving form of the hybrid vehicle is changed from a driving form in which the hybrid vehicle is driven only by power from the electric motor to a driving form in which the hybrid vehicle is driven by power from the internal combustion engine.

In accordance with an aspect of the control unit of the invention, wherein, when the internal combustion engine is started by power from the electric motor, the first engaging and disengaging mechanism is engaged while the first synchronizing unit is released.

In accordance with an aspect of the control unit of the invention, wherein, the transmission are controlled so that power from the internal combustion engine is transmitted to the output shaft via the second synchronizing unit by engaging the second engaging and disengaging mechanism between the fully applied state and the fully released state, and so that, when the state-of-charge of the battery exceeds the first charged level in a state where the first engaging and disengaging mechanism is engaged while the first synchronizing unit is released, power of the electric motor is transmitted to the output shaft by disengaging the first engaging and disengaging mechanism and the second engaging and disengaging mechanism.

In accordance with an aspect of the invention, a control unit is provided for a hybrid vehicle having an internal combustion engine (e.g., an engine 6 in embodiment) and an electric motor (e.g., a motor 7 in embodiment) as drive sources, the hybrid vehicle including:

a first transmission mechanism (e.g., a planetary gear mechanism 30, a third speed drive gear 23a, a fifth speed drive gear 25a in embodiment) in which mechanical power from an engine output shaft of the internal combustion engine and the electric motor is borne by a first input shaft (e.g., a first main shaft 11 in embodiment) that engages with the electric motor and any one of a plurality of change-speed gears is engaged via a first synchronizing unit (e.g., a brake mechanism 61, a first gear shifter 51 in embodiment) so that the first input shaft is brought into engagement with driven wheels (e.g., driven wheels DW in embodiment) of the hybrid vehicle;

a second transmission mechanism (e.g., a second speed drive gear 22a, a fourth speed drive gear 24a in embodiment) in which mechanical power from the engine output shaft is borne by a second input shaft (e.g., a second intermediate shaft 16 in embodiment) and any of a plurality of change-speed gears is engaged via a second synchronizing unit (e.g., a second gear shifter 52 in embodiment) so that the second input shaft is brought into engagement with the driven wheels;

a first engaging and disengaging mechanism (e.g., a first clutch 41 in embodiment) that is provided so as to correspond to the first transmission mechanism for engaging the engine output shaft with the first input shaft; and a second engaging and disengaging mechanism (e.g., a second clutch 42 in embodiment) that is provided so as to correspond to the second transmission mechanism for engaging the engine output shaft with the second input shaft, wherein the control unit controls the transmission so that with the hybrid vehicle driven at extremely low speeds only by power from the electric motor, when a state-of-charge of a battery (e.g., the battery 3 in embodiment) that supplies electric power to the electric motor becomes equal to or smaller than a first charged level, power from the internal combustion engine is transmitted to an output shaft by engaging the first engaging and disengaging mechanism, starting the internal combustion engine by power from the electric motor, and thereafter, engaging the first engaging and disengaging mechanism or the second engaging and disengaging mechanism between a fully applied state and a fully released state.

In accordance with an aspect of the invention, a control method is provided for a hybrid vehicle having an internal combustion engine (e.g., an engine 6 in embodiment) and an electric motor (e.g., a motor 7 in embodiment) as drive sources, the hybrid vehicle including:

a first transmission mechanism (e.g., a planetary gear mechanism 30, a third speed drive gear 23a, a fifth speed drive gear 25a in embodiment) in which mechanical power from an engine output shaft of the internal combustion engine and the electric motor is borne by a first input shaft (e.g., a first main shaft 11 in embodiment) that engages with the electric motor and any one of a plurality of change-speed gears is engaged via a first synchronizing unit (e.g., a brake mechanism 61, a first gear shifter 51 in embodiment) so that the first input shaft is brought into engagement with driven wheels (e.g., driven wheels DW in embodiment) of the hybrid vehicle;

a second transmission mechanism (e.g., a second speed drive gear 22a, a fourth speed drive gear 24a in embodiment) in which mechanical power from the engine output shaft is borne by a second input shaft (e.g., a second intermediate shaft 16 in embodiment) and any of a plurality of change-speed gears is engaged via a second synchronizing unit (e.g., a second gear shifter 52 in embodiment) so that the second input shaft is brought into engagement with the driven wheels;

a first engaging and disengaging mechanism (e.g., a first clutch 41 in embodiment) that is provided so as to correspond to the first transmission mechanism for engaging the engine output shaft with the first input shaft;

a second engaging and disengaging mechanism (e.g., a second clutch 42 in embodiment) that is provided so as to correspond to the second transmission mechanism for engaging the engine output shaft with the second input shaft;

an air conditioner compressor (e.g., an air conditioner compressor 112 in embodiment) that is connected to the first input shaft via an air conditioner clutch (e.g., an air conditioner clutch 121 in embodiment) and which operates based on electric power from a battery (e.g., a battery 3 in embodiment) that supplies electric power to the electric motor; and a control unit (e.g., a control unit 2 in embodiment) for controlling the internal combustion engine, the electric motor and the transmission, wherein the control unit controls the transmission so that with the hybrid vehicle driven at extremely low speeds only by power from the electric motor, when a state-of-charge of the battery becomes equal to or smaller than a first charged level or when a rotational speed required on the air conditioner compressor is less than a desired rotational speed, power from the internal combustion engine is transmitted to an output shaft by engaging the first engaging and disengaging mechanism, starting the internal combustion engine by power from the electric motor, and thereafter, engaging the first engaging and disengaging mechanism or the second engaging and disengaging mechanism between a fully applied state and a fully released state.

In accordance with an aspect of the invention, a control method is provided for a hybrid vehicle having an internal combustion engine (e.g., an engine 6 in embodiment) and an electric motor (e.g., a motor 7 in embodiment) as drive sources, the hybrid vehicle including:

a first transmission mechanism (e.g., a planetary gear mechanism 30, a third speed drive gear 23a, a fifth speed drive gear 25a in embodiment) in which mechanical power from an engine output shaft of the internal combustion engine and the electric motor is borne by a first input shaft (e.g., a first main shaft 11 in embodiment) that engages with the electric motor and any one of a plurality of change-speed gears is engaged via a first synchronizing unit (e.g., a brake mechanism 61, a first gear shifter 51 in embodiment) so that the first input shaft is brought into engagement with driven wheels (e.g., driven wheels DW in embodiment) of the hybrid vehicle;

a second transmission mechanism (e.g., a second speed drive gear 22a, a fourth speed drive gear 24a in embodiment) in which mechanical power from the engine output shaft is borne by a second input shaft (e.g., a second intermediate shaft 16 in embodiment) and any of a plurality of change-speed gears is engaged via a second synchronizing unit (e.g., a second gear shifter 52 in embodiment) so that the second input shaft is brought into engagement with the driven wheels;

a first engaging and disengaging mechanism (e.g., a first clutch 41 in embodiment) that is provided so as to correspond to the first transmission mechanism for engaging the engine output shaft with the first input shaft;

a second engaging and disengaging mechanism (e.g., a second clutch 42 in embodiment) that is provided so as to correspond to the second transmission mechanism for engaging the engine output shaft with the second input shaft;

an air conditioner compressor (e.g., an air conditioner compressor 112 in embodiment) that is connected to the first input shaft via an air conditioner clutch (e.g., an air conditioner clutch 121 in embodiment); and a control unit (e.g., a control unit 2 in embodiment) for controlling the internal combustion engine, the electric motor and the transmission, wherein the control unit controls the transmission so that with the hybrid vehicle driven at extremely low speeds only by power from the electric motor, when a state-of-charge of a battery (e.g., the battery 3 in embodiment) that supplies electric power to the electric motor becomes equal to or smaller than a first charged level or when a rotational speed required on the air conditioner compressor is less than a desired rotational speed, power from the internal combustion engine is transmitted to an output shaft by engaging the first engaging and disengaging mechanism, starting the internal combustion engine by power from the electric motor, and thereafter, engaging the first engaging and disengaging mechanism or the second engaging and disengaging mechanism between a fully applied state and a fully released state.

In accordance with an aspect of the invention, a control method is provided for a hybrid vehicle having an internal combustion engine (e.g., an engine 6 in embodiment) and an electric motor (e.g., a motor 7 in embodiment) as drive sources, the hybrid vehicle including:

a first transmission mechanism (e.g., a planetary gear mechanism 30, a third speed drive gear 23a, a fifth speed drive gear 25a in embodiment) in which mechanical power from an engine output shaft of the internal combustion engine and the electric motor is borne by a first input shaft (e.g., a first main shaft 11 in embodiment) that engages with the electric motor and any one of a plurality of change-speed gears is engaged via a first synchronizing unit (e.g., a brake mechanism 61, a first gear shifter 51 in embodiment) so that the first input shaft is brought into engagement with driven wheels (e.g., driven wheels DW in embodiment) of the hybrid vehicle;

a second transmission mechanism (e.g., a second speed drive gear 22a, a fourth speed drive gear 24a in embodiment) in which mechanical power from the engine output shaft is borne by a second input shaft (e.g., a second intermediate shaft 16 in embodiment) and any of a plurality of change-speed gears is engaged via a second synchronizing unit (e.g., a second gear shifter 52 in embodiment) so that the second input shaft is brought into engagement with the driven wheels;

a first engaging and disengaging mechanism (e.g., a first clutch 41 in embodiment) that is provided so as to correspond to the first transmission mechanism for engaging the engine output shaft with the first input shaft;

a second engaging and disengaging mechanism (e.g., a second clutch 42 in embodiment) that is provided so as to correspond to the second transmission mechanism for engaging the engine output shaft with the second input shaft; and a control unit (e.g., a control unit 2 in embodiment) for controlling the internal combustion engine, the electric motor and the transmission, wherein the control unit controls the transmission so that with the hybrid vehicle driven at extremely low speeds only by power from the electric motor, when a state-of-charge of a battery (e.g., the battery 3 in embodiment) that supplies electric power to the electric motor becomes equal to or smaller than a first charged level, power from the internal combustion engine is transmitted to an output shaft by engaging the first engaging and disengaging mechanism, starting the internal combustion engine by power from the electric motor, and thereafter, engaging the first engaging and disengaging mechanism or the second engaging and disengaging mechanism between a fully applied state and a fully released state.

Advantage of the Invention

According to aspects of the control unit and the control method of the present invention, when the hybrid vehicle is driven at extremely low speeds, the driving form of the hybrid vehicle can be switched to the driving form that is suitable for the state-of-charge of the battery or the operation required on the air conditioner.

According to the aspects of the control unit of the present invention, part of the power of the internal combustion engine is transmitted to the electric motor via the first engaging and disengaging mechanism and the first synchronizing unit, whereby the electric motor generates electric energy. Because of this, the battery can be charged.

According to aspects of the control unit of the present invention, the increase in temperature of the second engaging and disengaging mechanism can be prevented.

According to aspects of the control unit of the present invention, when the battery returns to the state-of-charge that exceeds the first charged level, the driving form can be returned to the driving form in which the hybrid vehicle is driven only by power from the electric motor.

According to aspects of the control unit of and the control method of the present invention, when the hybrid vehicle is driven at extremely low speeds, the driving form of the hybrid vehicle can be switched to the driving form that is suitable for the state-of-charge of the battery or the operation required on the air conditioner.

MODE FOR CARRYING OUT THE INVENTION

An embodiment of the invention will be described by reference to the drawings.

Figure 1:
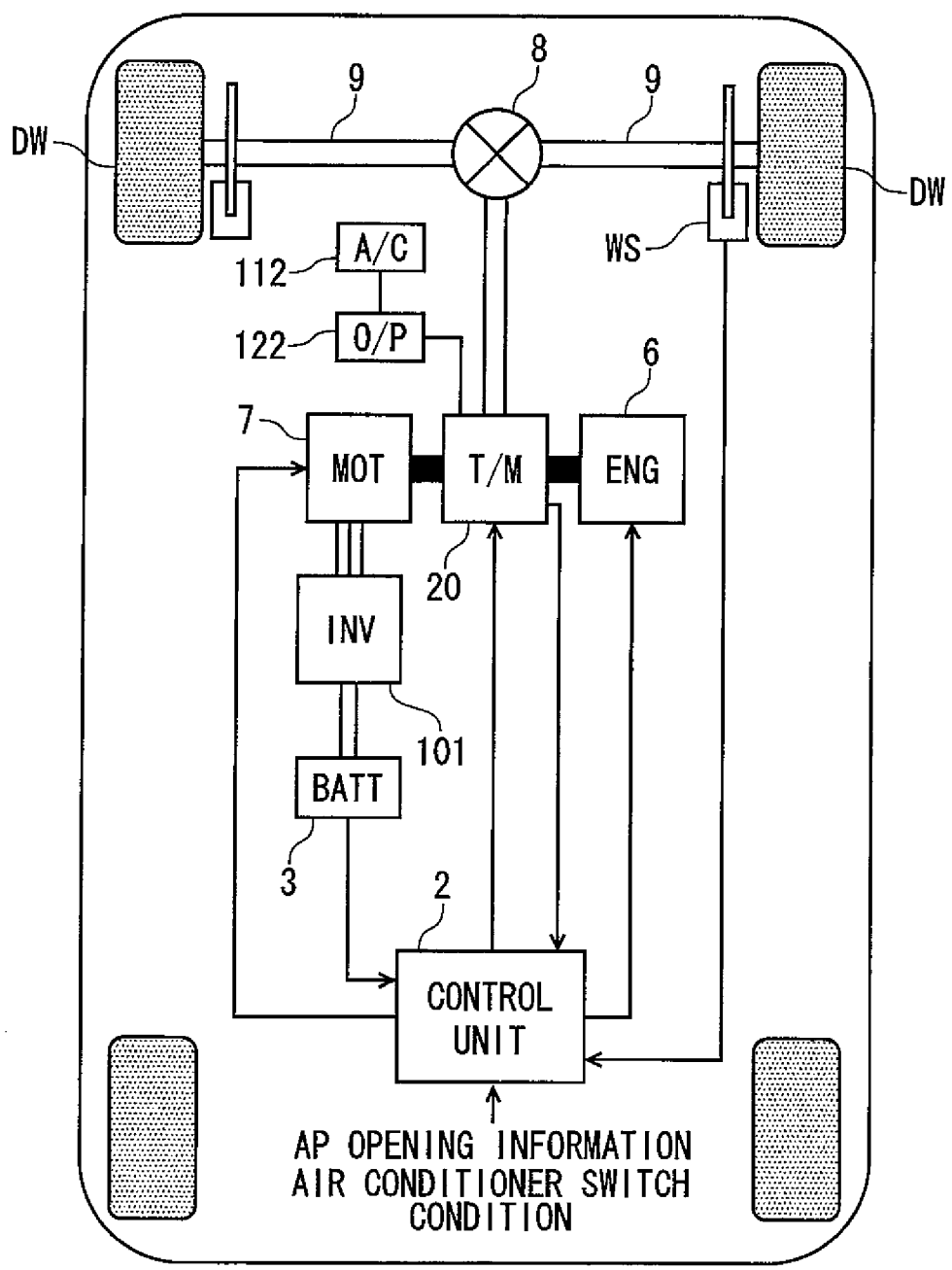
FIG. 1 shows an internal configuration of an HEV of an embodiment of the invention.

An HEV (Hybrid Electrical Vehicle) is driven by driving force of an internal combustion engine (engine) and/or an electric motor (motor). FIG. 1 shows an internal configuration of an HEV according to an embodiment of the invention. The HEV (vehicle) shown in FIG. 1 includes an engine (ENG) 6 as a drive source, a motor (MOT) 7 as a drive source, a battery (BATT) 3, an inverter (INV) 101, a transmission (T/M) 20, an oil pump (O/P) 122, an air conditioner compressor (A/C) 112, a wheel speed sensor WS and a control unit 2.

Figure 2:
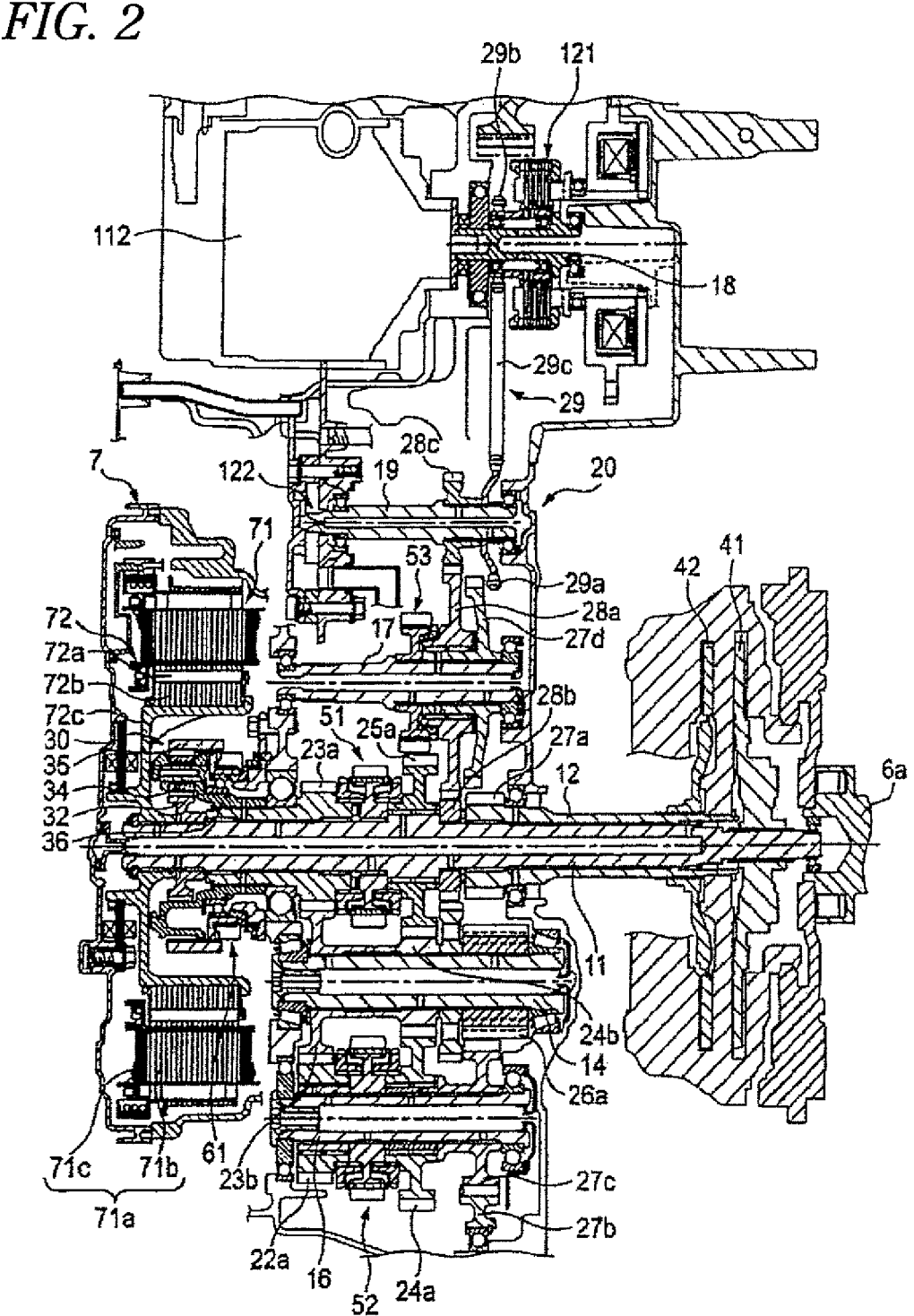
FIG. 2 shows sectional views of a motor 7 and a transmission 20.
Figure 3:
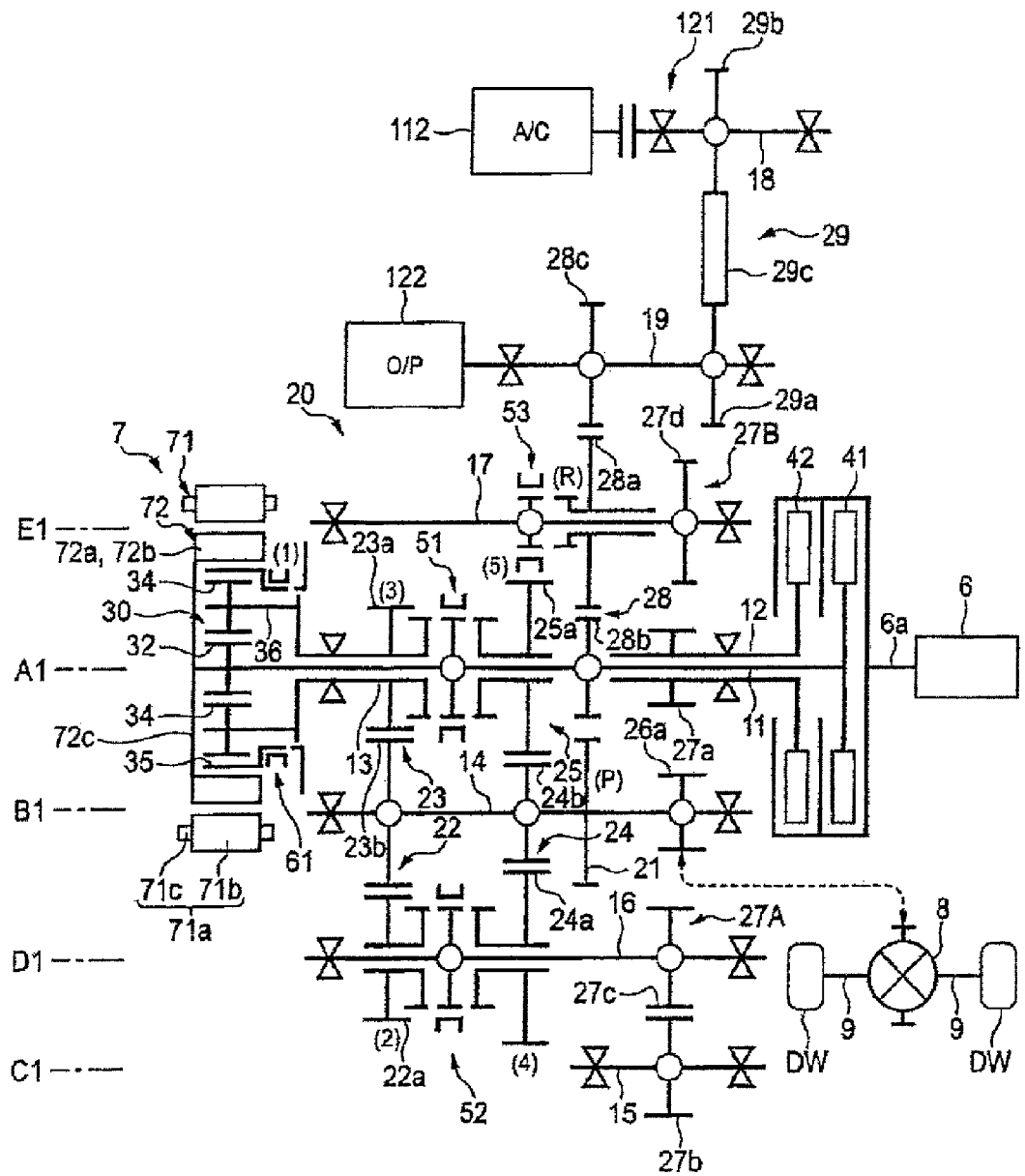
FIG. 3 conceptually shows internal configurations of the motor 7 and the transmission 20.

Relationships between the constituent elements and an internal configuration of the transmission 20 will be described by reference to FIGS. 2 and 3. FIG. 2 shows sectional views of the motor 7 and the transmission 20. FIG. 3 conceptually shows internal configurations of the motor 7 and the transmission 20.

The engine 6 is, for example, a gasoline engine or a diesel engine, and a crankshaft 6a of this engine 6 carries a first clutch 41 (a first engaging and disengaging mechanism) and a second clutch (a second engaging and disengaging mechanism) 42 of the transmission 20.

The motor 7 is a three-phase brushless DC motor and has a stator 71 that is made up of 3n armatures 71a and a rotor 72 that is disposed opposite to the stator 71. Each armature 71a includes an iron core 71b and a coil 71c that is wound round this iron core 71b. The armatures 71a are fixed to a casing, not shown, and are aligned at substantially equal intervals in a circumferential direction about a rotational shaft. 3n coils 71c make up n sets of coils of three phases including a U phase, a V phase and a W phase.

The rotor 72 has an iron core 72a and n permanent magnets 72b which are aligned at substantially equal intervals in a circumferential direction about the rotational shaft. Polarities of any two adjacent permanent magnets 72b are different from each other. A fixing portion 72c that fixes the iron core 72a in place has a hollow cylindrical shape, is disposed on an outer circumferential side of a ring gear 35 of a planetary gear mechanism 30, which will be described later, and is connected to a sun gear 32 of the planetary gear mechanism 30. Thus, the rotor 72 is made to rotate together with the sun gear 32 of the planetary gear mechanism 30.

The planetary gear mechanism 30 has the sun gear 32, the ring gear 35 which is disposed so as not only to be concentric with the sun gear 32 but also to surround the periphery of the sun gear 32, planetary gears 34 which are in mesh with the sun gear 32 and the ring gear 35 and a carrier 36 which supports the planetary gears 34 so as to allow them not only to rotate on their own axes but also to walk around the sun gear 32. Thus, the sun gear 32, the ring gear 35 and the carrier 36 are made to rotate differentially relative to each other.

A brake mechanism 61 (a synchronizer mechanism), which has a synchronizing mechanism (a synchronizer mechanism) and which is made to stop (lock) the rotation of the ring gear 35, is provided on the ring gear 35. A lock mechanism may be used in place of the brake mechanism 61.

Figure 4:
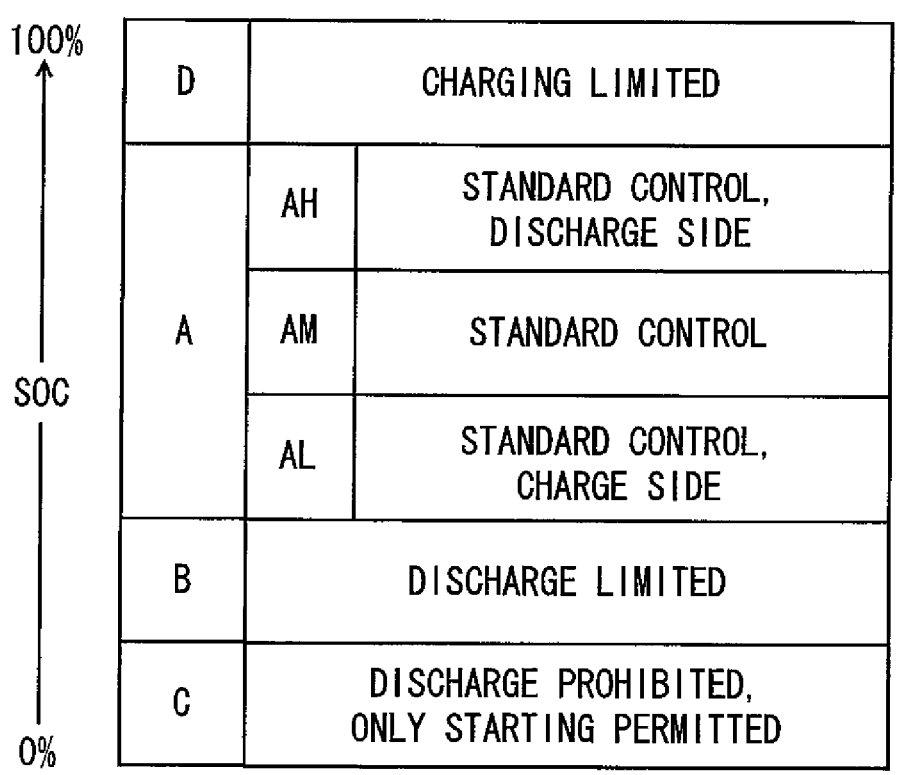
FIG. 4 shows zones of an SOC of a battery 3.

As shown in FIG. 1, the motor 7 is connected to the battery 3 via the inverter 101. The battery 3 has a plurality of battery cells that are connected in series and supplies a high voltage of 100 to 200 V, for example. The battery cell is, for example, a lithium ion battery or a nickel-metal hydride battery. An SOC (state of charge) indicates a charged state of the battery 3 and is classified into four zones of C, B, A and D in an incremental fashion as shown in FIG. 4. The zone A is classified, in turn, into three zones of A-L, A-M and A-H in an incremental fashion. Thus, the SOC is classified into these six zones in total.

The inverter 101 converts a direct current voltage from the battery 3 into an alternating current voltage based on a switching action of a switching element and then supplies the resulting alternating current voltage to the three-phase current motor 7. Additionally, the inverter 101 converts an alternating current voltage that is inputted thereinto when the motor 7 operates for regeneration into a direct current voltage for storage in the battery 3. Consequently, the motor 7 is driven by electric power supplied from the battery 3 and generates electric energy in a regenerative fashion through rotation of driven wheels DW during deceleration of the vehicle or by the power of the engine 6 so as to charge the battery 3 (recover energy). The motor 7 is also used to start the engine 6.

The transmission 20 is a so-called dual-clutch transmission for transmitting power from the engine 6 and/or the motor 7 to the driven wheels DW. The transmission 20 includes the first clutch 41, the second clutch 42 and the planetary gear mechanism 30, which have been described before, as well as a plurality of change-speed gearsets, which will be described later. A temperature sensor (not shown) is provided near the second clutch 42 for detecting the temperature of the second clutch 42. Data on the temperature of the second clutch 42 that is detected by the temperature sensor is sent to the control unit 2.

The configuration of the transmission 20 will be described in detail. The transmission 20 includes a first main shaft 11 (a first input shaft) that is disposed coaxially with the crankshaft 6a of the engine 6 (a rotational axis A1), a second main shaft 12, a connecting shaft 13, a counter shaft 14 (output shaft) that is rotatable about a rotational axis B1 disposed parallel to the rotational axis A1, a first intermediate shaft 15 that is rotatable about a rotational axis C1 disposed parallel to the rotational axis A1, a second intermediate shaft 16 (a second input shaft) that is rotatable about a rotational axis D1 disposed parallel to the rotational axis A1 and a reverse shaft 17 that is rotatable about a rotational axis E1 disposed parallel to the rotational axis A1.

The first clutch 41 is provided on the first main shaft 11 at an end lying to face the engine 6, and the sun gear 32 of the planetary gear mechanism 30 and the rotor 72 of the motor 7 are mounted on an end of the first main shaft 11 which lies opposite to the end facing the engine 6. Consequently, the first main shaft 11 is selectively connected to the crankshaft 6a of the engine 6 by the first clutch 41 and is connected directly to the motor 7, thus power of the engine 6 and/or the motor 7 being transmitted to the sun gear 32.

The second main shaft 12 is formed shorter than the first main shaft 11 and hollow and is disposed so as to rotate relative to the first main shaft 11 while surrounding the periphery of an end portion of the first main shaft 11 which lies to face the engine 6. The second clutch 42 is provided at an end of the second main shaft 12 which lies to face the engine 6, and an idle drive gear 27a is mounted integrally on an end portion of the second main shaft 12 which lies opposite to the end facing the engine 6. Consequently, the second main shaft 12 is selectively connected to the crankshaft 6a of the engine 6 by the second clutch 42, so that power of the engine 6 is transmitted to the idle drive gear 27a.

The connecting shaft 13 is formed shorter than the first main shaft 11 and hollow and is disposed so as to rotate relative to the first main shaft 11 while surrounding the periphery of an end portion of the first main shaft 11 which lies opposite to the end facing the engine 6. A third speed drive gear 23a is mounted integrally on an end portion of the connecting shaft 13 which lies to face the engine 6, and the carrier 36 of the planetary gear mechanism 30 is mounted on an end portion of the connecting shaft 13 which lies opposite to the end portion lying to face the engine 6. Consequently, the carrier 36 and the third speed drive gear 23a which are mounted on the connecting shaft 13 are made to rotate together when the planetary gears 34 walk around the sun gear 32.

A fifth speed drive gear 25a is provided on the first main shaft 11 so as to rotate relative to the first main shaft 11. A reverse driven gear 28b is also mounted on the first main shaft 11 so as to rotate together therewith. A first gear shifter 51 (a first synchronizing unit) is provide between the third speed drive gear 23a and the fifths speed drive gear 25a, and this first gear shifter 51 connects or disconnects the first main shaft 11 with or from the third speed drive gear 23a or the fifth speed drive gear 25a. When the first gear shifter 51 is engaged in a third speed engaging position, the first main shaft 11 is connected to the third speed drive gear 23a so as to rotate together therewith. When the first gear shifter 51 is engaged in a fifth speed engaging position, the first main shaft 11 rotates together with the fifth speed drive gear 25a. When the first gear shifter 51 is in a neutral position, the first main shaft 11 rotates relative to the third speed drive gear 23a and the fifth speed drive gear 25a. When the first main shaft 11 and the third speed drive gear 23a rotate together, the sun gear 32 that is mounted on the first main shaft 11 rotates together with the carrier 36 that is connected to the third speed drive gear 23a via the connecting shaft 13, and the ring gear 35 also rotate together therewith, whereupon the planetary gear mechanism 30 is brought into a solid unit. Additionally, when the brake mechanism 61 is applied with the first gear shifter 51 staying in the neutral position, the ring gear 35 is locked, and the rotation of the sun gear 32 is transmitted to the carrier 36 while being decelerated.

A first idle driven gear 27b is mounted integrally on the first intermediate shaft 15, and this first idle driven gear 27b meshes with the idle drive gear 27a that is mounted on the second main shaft 12.

A second idle driven gear 27c is mounted integrally on the second intermediate shaft 16, and the second idle driven gear 27c meshes with the first idle driven gear 27b that is mounted on the first intermediate shaft 15. The second idle driven gear 27c makes up a first idle gear train 27A together with the idle drive gear 27a and the first idle driven gear 27b which have been described before. A second speed drive gear 22a and a fourth speed drive gear 24a are provided on the second intermediate shaft 16 in positions which correspond, respectively, to the third speed drive gear 23a and the fifth speed drive gear 25a which are provided around the first main shaft 11, the second speed drive gear 22a and the fourth speed drive gear 24a being individually made to rotate relative to the second intermediate shaft 16. A second gear shifter 52 (a second synchronizing unit) is provided on the second intermediate shaft 16 between the second speed drive gear 22a and the fourth speed drive gear 24a, and this second gear shifter 52 connects or disconnects the second intermediate shaft 16 with or from the second speed drive gear 22a or the fourth speed drive gear 24a. When the second gear shifter 52 is engaged in a second speed engaging position, the second intermediate shaft 16 rotates together with the second speed drive gear 22a. When the second gear shifter 52 is engaged in a fourth speed engaging position, the second intermediate shaft 16 rotates together with the fourth speed drive gear 24a. When the second gear shifter 52 is in a neutral position, the second intermediate shaft 16 rotates relative to the second speed drive gear 22a and the fourth speed drive gear 24a.

A first common driven gear 23b, a second common driven gear 24b, a parking gear 21 and a final gear 26a are mounted integrally on the counter shaft 14 sequentially in that order as seen from an opposite end of the counter shaft 14 to an end which lies to face the engine 6.

Here, the first common driven gear 23b meshes with the third speed drive gear 23a that is mounted on the connecting shaft 13 and then makes up a third speed gear pair 23 together with the third speed drive gear 23a and meshes with the second speed drive gear 22a that is provided on the second intermediate shaft 16 and then makes up a second speed gear pair 22 together with the second speed drive gear 22a.

The second common driven gear 24b meshes with the fifth speed drive gear 25a that is provided on the first main shaft 11 and then makes up a fifth speed gear pair 25 together with the fifth speed drive gear 25a and meshes with the fourth speed drive gear 24a that is provided on the second intermediate shaft 16 and then makes up a fourth speed gear pair 24 together with the fourth speed drive gear 24a.

The final gear 26a meshes with the differential gear mechanism 8, and the differential gear mechanism 8 is connected to the driven wheels DW via drive shafts 9. Consequently, power that is transmitted to the counter shaft 14 is outputted from the final gear 26a to the differential gear mechanism 8, the drive shafts 9 and the driven wheels DW.

A third idle driven gear 27d is mounted integrally on the reverse shaft 17, and this third idle driven gear 27d meshes with the first idle driven gear 27b that is mounted on the first intermediate shaft 15. The third idle driven gear 27d makes up a second idle gear train 27B together with the idle drive gear 27a and the first idle driven gear 27b which have been described before. A reverse drive gear 28a is provided on the reverse shaft 17 so as to rotate relative to the reverse shaft 17, and this reverse drive gear 28a meshes with a reverse driven gear 28b that is mounted on the first main shaft 11. The reverse drive gear 28a makes up a reverse gear train 28 together with the reverse driven gear 28b. A reverse shifter 53 is provided on the reverse shaft 17 in a position lying on a side of the reverse drive gear 28a which lies opposite to a side facing the engine 6. This reverse shifter 53 connects or disconnects the reverse shaft 17 with or from the reverse drive gear 28a. When the reverse shifter 53 is engaged in a reverse engaging position, the reverse shaft 17 rotates together with the reverse drive gear 28a, and when the reverse shifter 53 is in a neutral position, the reverse shaft 17 rotates relative to the reverse drive gear 28a.

The first gear shifter 51, the second gear shifter 52 and the reverse shifter 53 include clutch mechanisms having a synchronizing mechanism (a synchronizer mechanism) for matching the rotational speeds of a shaft and a gear which are connected together thereby.

In the transmission 20, an odd-numbered gearset (a first gearset) made up of the third speed drive gear 23a and the fifth speed drive gear 25a is provided on the first main shaft 11, which is one change-speed shaft of two change-speed shafts, and an even-numbered gearset (a second gearset) made up of the second speed drive gear 22a and the fourth speed drive gear 24a is provided on the second intermediate shaft 16, which is the other change-speed shaft of the two change-speed shafts. The even-numbered gearset may have further a sixth speed drive gear and the odd-numbered gearset of the transmission 20 may have further a seventh speed drive gear.

Thus, the transmission 20 of this embodiment has the following first to fifth transmission lines.

(1) In a first transmission line, the crankshaft 6a of the engine 6 is connected to the driven wheels DW via the first main shaft 11, the planetary gear mechanism 30, the connecting shaft 13, the third speed gear pair 23 (the third speed drive gear 23a, the first common driven gear 23b), the counter shaft 14, the final gear 26a, the differential gear mechanism 8 and the drive shafts 9. Here, a reduction ratio of the planetary gear mechanism 30 is set so that engine torque that is transmitted to the driven wheels DW by way of the first transmission line corresponds to a first speed. Namely, the reduction ratio of the planetary gear mechanism 30 is set so that a reduction ratio resulting from multiplication of the reduction ratio of the planetary gear mechanism 30 by the gear ratio of the third speed gear pair 23 corresponds to the first speed.

(2) In a second transmission line, the crankshaft 6a of the engine 6 is connected to the driven wheels DW via the second main shaft 12, the first idle gear train 27A (the idle drive gear 27a, the first idle driven gear 27b, the second idle driven gear 27c), the second intermediate shaft 16, the second speed gear pair 22 (the second speed drive bear 22a, the first common driven gear 23b) or the fourth speed gear pair 24 (the fourth speed drive gear 24a, the second common driven gear 24b), the counter shaft 14, the final gear 26a, the differential gear mechanism 8 and the drive shafts 9.

(3) In a third transmission line, the crankshaft 6a of the engine 6 is connected to the driven wheels DW via the first main shaft 11, the third speed gear pair 23 (the third speed drive gear 23a, the first common driven gear 23b) or the fifth speed gear pair 25 (the fifth speed drive gear 25a, the second common driven gear 24b), the counter shaft 14, the final gear 26a, the differential gear mechanism 8 and the drive shafts 9 without involving the planetary gear mechanism 30.

(4) In a fourth transmission line, the motor 7 is connected to the driven wheels DW via the planetary gear mechanism 30 or the third speed gear pair 23 (the third speed drive gear 23a, the first common driven gear 23b) or the fifth speed gear pair 25 (the fifth speed drive gear 25a, the second common driven gear 24b), the counter shaft 14, the final gear 26a, the differential gear mechanism 8 and the drive shafts 9.

(5) In a fifth transmission line, the crankshaft 6a of the engine 6 is connected to the driven wheels DW via the second main shaft 12, the second idle gear train 27B (the idle drive gear 27a, the first idle driven gear 27b, the third idle driven gear 27d), the reverse shaft 17, the reverse gear train 28 (the reverse drive gear 28a, the reverse driven gear 28b), the planetary gear mechanism 30, the connecting shaft 13, the third speed gear pair 23 (the third speed drive gear 23a, the first common driven gear 23b), the counter shaft 14, the final gear 26a, the differential gear mechanism 8 and the drive shafts 9.

The oil pump 122 is mounted on an oil pump auxiliary shaft 19 that is disposed parallel to the rotational axes A1 to E1 of the transmission 20 so as to rotate together with the oil pump auxiliary shaft 19. An oil pump driven gear 28c that meshes with the reverse drive gear 28a and an air conditioner drive gear 29a are mounted on the oil pump auxiliary shaft 19 so as to rotate together therewith, and power of the engine 6 and/or the motor 7 which rotates the first main shaft 11 is transmitted thereto.

The air conditioner compressor 112 is provided on an air conditioner auxiliary shaft 18 that is disposed parallel to the rotational axes A1 to E1 via an air conditioner clutch 121. An air conditioner driven gear 29b, to which power is transmitted from the air conditioner drive gear 29a via a chain 29c, is mounted on the air conditioner auxiliary shaft 18 so as to rotate together with the air conditioner auxiliary shaft 18, whereby the power of the engine 6 and/or the motor 7 is transmitted from the oil pump auxiliary shaft 19 via an air conditioner transmission mechanism 29 that is made up of the air conditioner drive gear 29a, the chain 29c and the air conditioner driven gear 29b. Transmitting power to the air conditioner compressor 112 is enabled or disabled by applying or releasing the air conditioner clutch 121 by an air conditioner actuating solenoid.

The wheel speed sensor WS detects the rotational speed of the drive shaft 9. The rotational speed of the drive shaft 9 equals the rotational speed of the driven wheel DW. A signal signaling the rotational speed that is detected by the wheel speed sensor WS is sent to the control unit 2.

The control unit 2 controls the engine 6, the motor 7 and the transmission 20. Namely, the control unit 2 outputs a signal that controls the engine 6, a signal that controls the motor 7, and signals that control the first gear shifter 51, the second gear shifter 52 and the reverse shifter 53 of the transmission 20, as well as a signal that controls the application (locking) and release (neutralizing) of the brake mechanism 61 and a signal that controls the application or release of the air conditioner clutch 121. Information is inputted into the control unit 2. The information includes pieces of information on the rotational speed of the driven wheel DW that is detected by the wheel speed sensor WS, the SOC of the battery 3, an accelerator pedal opening (AP opening), the state of an air conditioner switch, the shift position of the transmission 20 and the temperature of the second clutch 42 of the transmission 20. Also, the control unit 2 detects whether the brake mechanism 61 is applied or released and the respective positions of the first gear shifter 51 and the second gear shifter 52.

The control unit 2 calculates a vehicle speed (the current vehicle speed) based on the rotational speed of the driven wheel DW that is detected by the wheel speed sensor WS and then calculates an average vehicle speed from the vehicle speed so calculated. Also, the control unit 2 calculates a required driving force based on the AP opening and the vehicle speed. Further, the control unit 2 determines on the driving condition of the vehicle based on the current vehicle speed, the average vehicle speed and the required driving force. The control unit 2 can determine whether or not the vehicle is being driven on a congested road with a heavy traffic based on the determination so made.

The control unit 2 controls the start and stop of operation of the air conditioner compressor 112 (the application and release of the air conditioner clutch 121). The control unit 2 reads in output signals from an air conditioning temperature setting switch which sets an air conditioning temperature (a cooling temperature), an air conditioner switch which switches on or off the air conditioning operation of an air conditioner and a rotational speed sensor (not shown) for detecting the shaft rotational speed of the counter shaft 14 and then PWM (Pulse Width Modulation) controls the start and stop of operation of the air conditioner compressor 112 (the application and release of the air conditioner clutch 121) so as to control the inside temperature of the passenger compartment to a set temperature during an air conditioning operation (while the air conditioner switch 135 is on).

The control unit 2 controls the engagement and disengagement of the first clutch 41 and the second clutch 42 of the transmission 20 and controls (pre-shifts) the applying and engaging positions of the brake mechanism 61, the first gear shifter 51, the second gear shifter 52 and the reverse shifter 53, whereby the vehicle can be driven in first- to fifth-speed gears by the engine 6.

When the vehicle is driven in the first-speed gear, the control unit 2 applies the first clutch 41 and also applies the brake mechanism 61, whereby the driving force is transmitted to the driven wheels DW by way of the first transmission line. When the vehicle is driven in the second-speed gear, the control unit 2 applies the second clutch 42 and engages the second gear shifter 52 in the second speed engaging position, whereby the driving force is transmitted to the driven wheels DW by way of the second transmission line. When the vehicle is driven in the third-speed gear, the control unit 2 applies the first clutch 41 and engages the first gear shifter 51 in the third speed engaging position, whereby the driving force is transmitted to the driven wheels DW by way of the third transmission line.

When the vehicle is driven in the fourth-speed gear, the control unit 2 applies the first clutch 41 and engages the second gear shifter 52 in the fourth speed engaging position, whereby the driving force is transmitted to the driven wheels DW by way of the second transmission line. When the vehicle is driven in the fifth-speed gear, the control unit 2 engages the first gear shifter 51 in the fifth speed engaging position, whereby the driving force is transmitted to the driven wheels DW by way of the third transmission line. When the vehicle is reversed, the control unit 2 applies the second clutch 42 and engages the reverse shifter 53, whereby the vehicle is reversed by the driving force transmitted by way of the fifth transmission line.

By applying the brake mechanism 61 or pre-shifting the first and second gear shifters 51, 52 while the vehicle is being driven by the engine, the motor 7 is allowed to assist the engine 6 to drive the vehicle or to execute regeneration. Further, even while the vehicle stays idle, the engine 6 can be started by the motor 7 and the battery 3 can be charged. The vehicle can be driven electrically by the motor 7 in an EV driving with the first and second clutches 41, 42 disengaged. As driving modes in the EV driving, there exist such driving modes as a first speed EV mode in which the vehicle is driven by the driving force transmitted by way of the fourth transmission line with the first and second clutches 41, 42 disengaged and the brake mechanism 61 applied, a third speed EV mode in which the vehicle is driven by the driving force transmitted by way of the fourth transmission line with the first gear shifter 51 engaged in the third speed engaging position, and a fifth speed EV mode in which the vehicle is driven by the driving force transmitted by way of the fourth transmission line with the first gear shifter 51 engaged in the fifth speed engaging position.

The air conditioner compressor 112 is connected to the first main shaft 11, and therefore, when the vehicle is driven in any of the odd-numbered gears, the first main shaft 11 inevitably rotates, and thus, the air conditioner compressor 112 can be operated. In order to actuate the air conditioner compressor 112 when the vehicle is being driven in any of the even-numbered gears, the first main shaft 11 needs to be rotated.

Referring to FIGS. 5 to 11, controls executed by the control unit 2 when the vehicle is driven at extremely low speeds, for example, of 7 km/h or lower due to a traffic jam will be described. The extremely low speed driving when the vehicle is being driven by the power from the engine 6 means a driving in which the vehicle is driven at vehicle speeds that require the clutch to be applied partially.

(First Exemplary Control)

Figure 5:
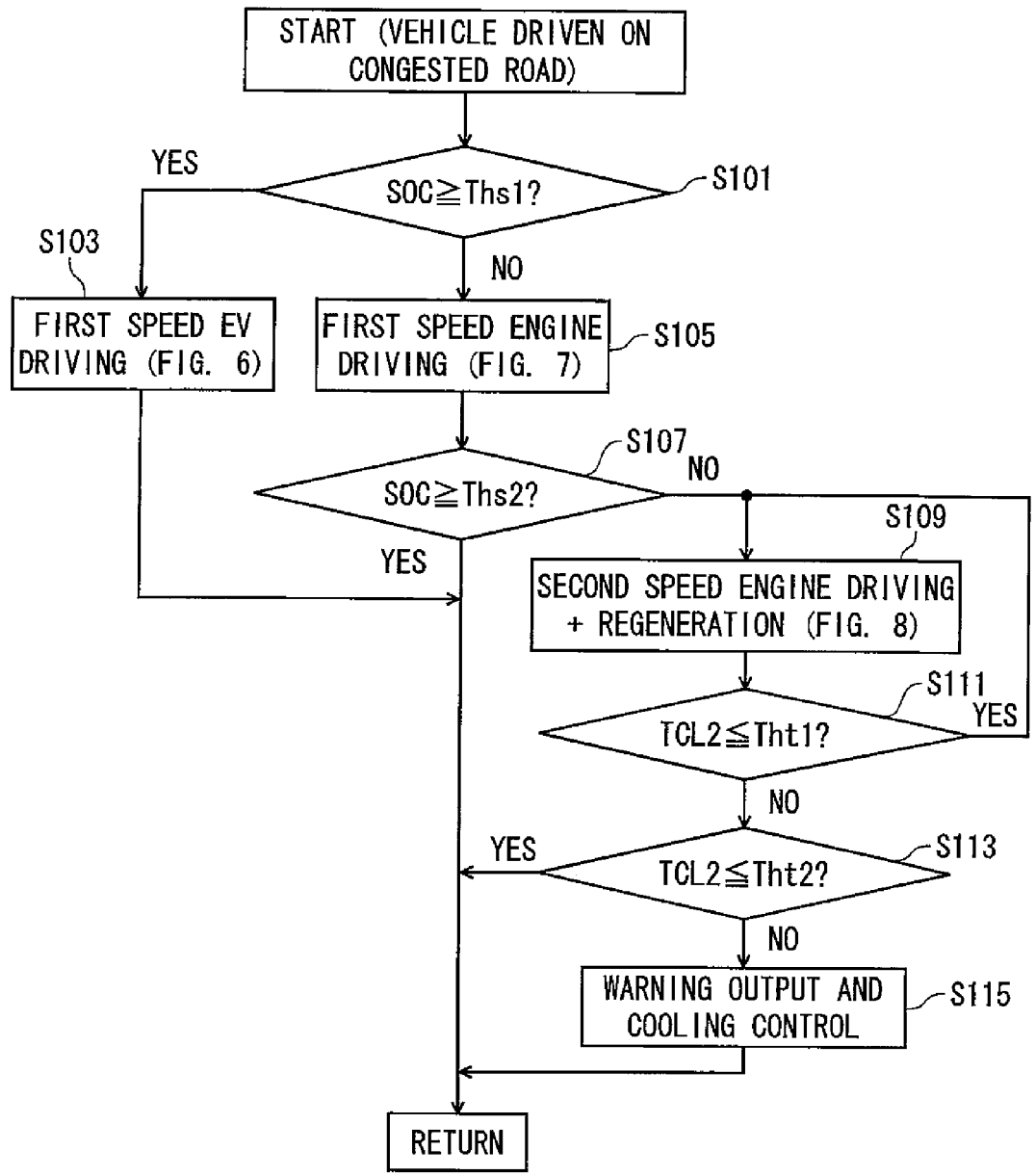
FIG. 5 is a flowchart of a first exemplary control that is executed by a control unit 2 of a vehicle that is being driven at extremely low speeds.

FIG. 5 is a flowchart of a first exemplary control that is executed by the control unit 2 of the vehicle that is driven at extremely low speeds. As shown in FIG. 5, when determining that the vehicle is being driven on a congested road with a heavy traffic, the control unit 2 determines whether or not the SOC of the battery 3 is equal to or larger than a first threshold Ths1 (step S101). The first threshold Ths1 is, for example, a lowest value of the zone A-H shown in FIG. 4. If the SOC of the battery 3 is determined to be equal to or larger than the first threshold Ths1 (SOC≥Ths1) as a result of the determination made in step S101, the flow of the flowchart proceeds to step S103, whereas if the SOC of the battery 3 is smaller than the first threshold Ths1 (SOC<Ths1), the flow proceeds to step S105.

Figure 6:
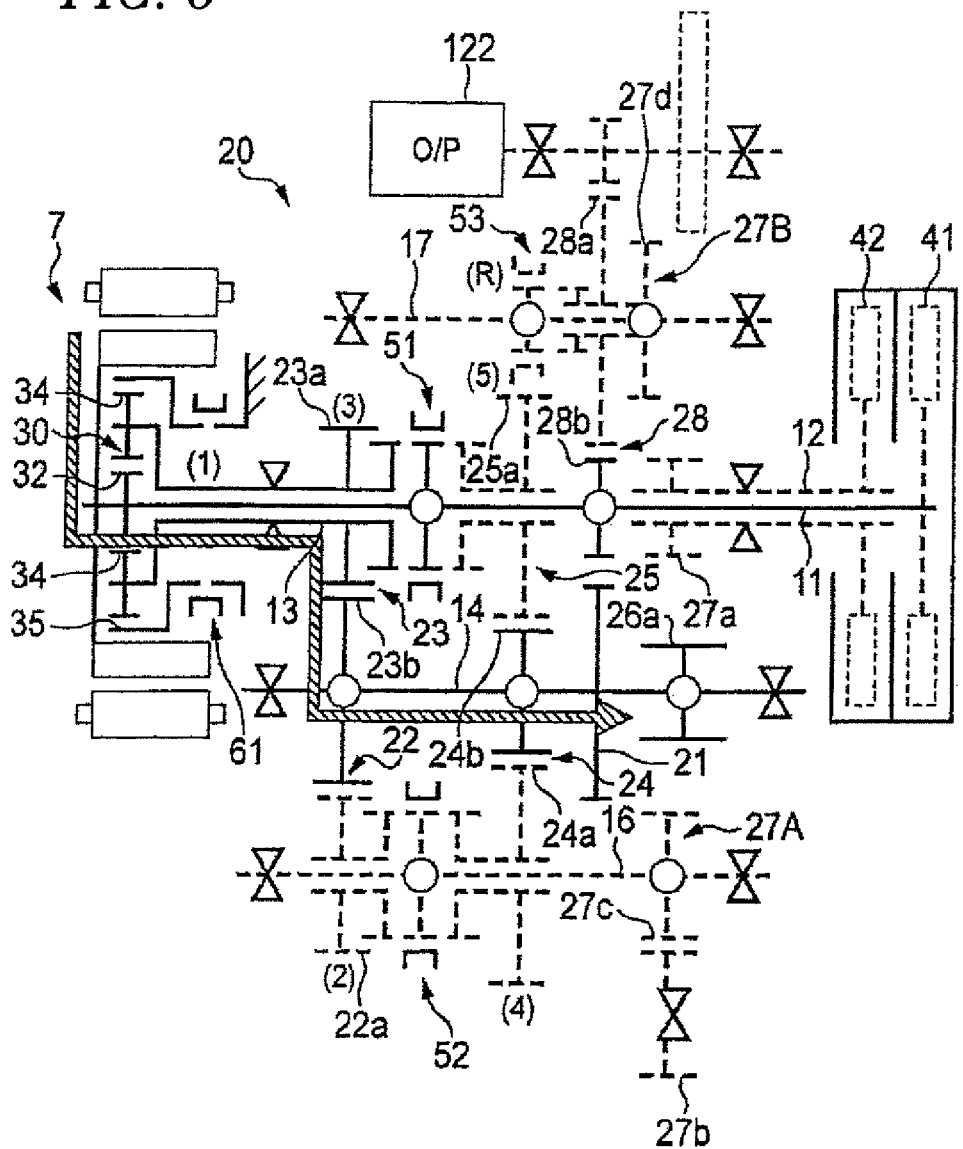
FIG. 6 conceptually shows a power transmission line in the transmission 20 when the vehicle is driven in a first speed EV driving.

In step S103, the control unit 2 drives the transmission 20 and the motor 7 so that the vehicle is driven in the first speed EV driving. FIG. 6 conceptually shows a power transmission line that occurs in the transmission 20 when the vehicle is driven in the first speed EV driving. As shown in FIG. 6, when the vehicle is driven in the first speed EV driving, the control unit 2 disengages the first and second clutches 41, 42 of the transmission 20 and applies the brake mechanism 61. Further, the control unit 2 controls the motor 7 so as to output a required driving force.

Figure 7:
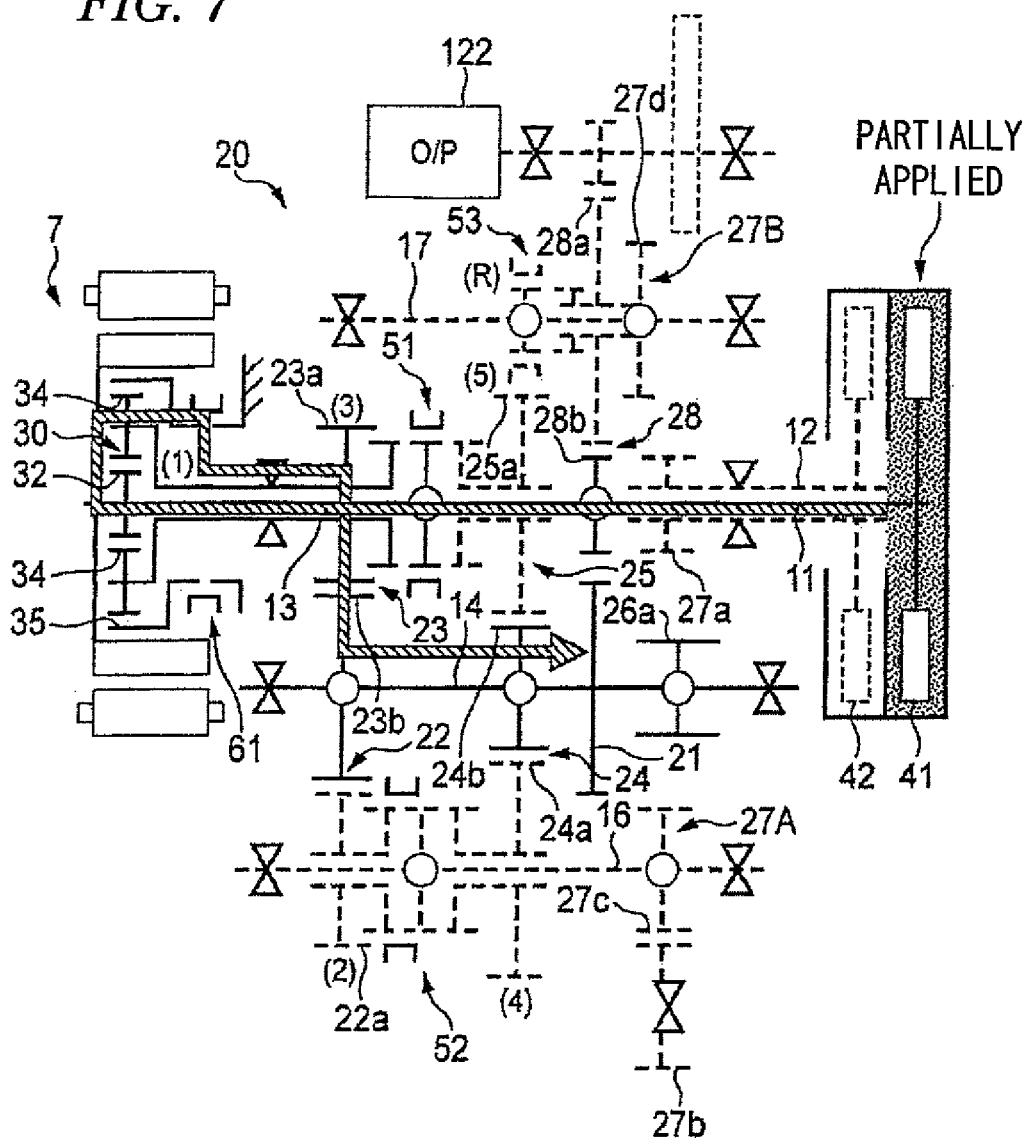
FIG. 7 conceptually shows a power transmission line in the transmission 20 when the vehicle is driven in a first speed engine driving FIG. 8 conceptually shows a power transmission line in the transmission 20 when the vehicle is driven in a second speed engine driving.

On the other hand, in step S105, the control unit 2 drives the transmission 20 and the engine 6 so that the vehicle is driven in a first speed engine driving. FIG. 7 conceptually shows a power transmission line that occurs in the transmission 20 when the vehicle is driven in the first speed engine driving. As shown in FIG. 7, when the vehicle is driven in the first speed engine driving, the control unit 2 firstly applies the second clutch 42 of the transmission 20 with the brake mechanism 61 kept applied to thereby start off the engine 6 using part of the power of the motor 7. Thereafter, the control unit 2 disengages the second clutch 42 with the brake mechanism 61 kept applied and applies the first clutch 41 partially. The degree of application of the first clutch 41 is controlled by the control unit 2 depending upon a required driving force, a reduction ratio of the first speed gear and the balance in rotational speed of the engine 6. The rotational speed of the engine 6 is a rotational speed on a BSFC bottom line which results from connection of operation points of the engine 6 where the best fuel consumption is obtained or a predetermined rotational speed necessary for the engine 6 to continue to run without stalling.

After step S105, the control unit 2 determines whether or not the SOC of the battery 3 is equal to or larger than a second threshold Ths2 (step S107). The second threshold Ths2 is, for example, a maximum value of the zone B shown in FIG. 4. If the SOC of the battery 3 is determined to be smaller than the second threshold (SOC<Ths2) as a result of the determination made in step S107, the flow proceeds to step S109.

Figure 8:
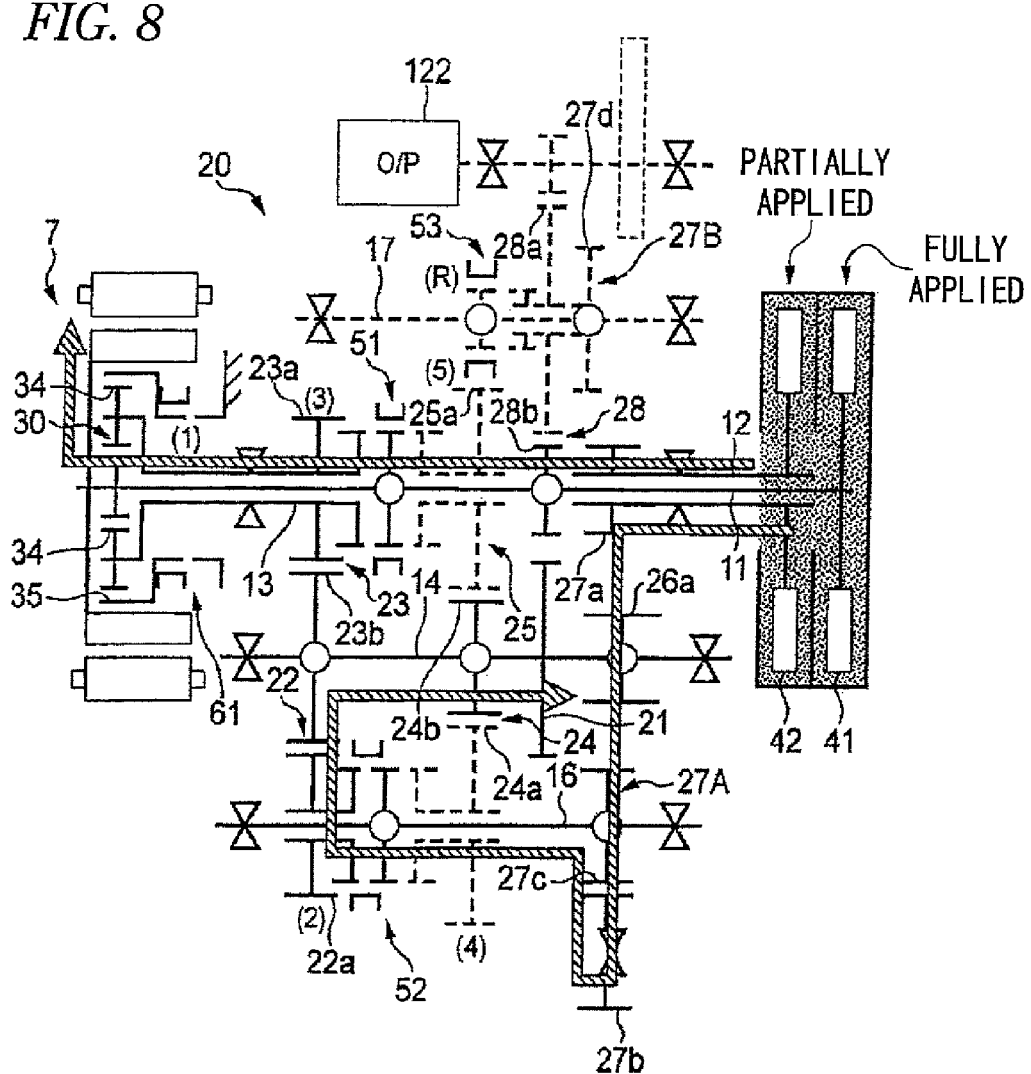

In step S109, the control unit 2 drives the transmission 20 and the engine 6 so that the vehicle is driven in a second speed engine driving. FIG. 8 conceptually shows a power transmission line that occurs in the transmission 20 when the vehicle is driven in the second speed engine driving. As shown in FIG. 8, when the vehicle is driven in the second speed engine driving, the control unit 2 engages the second gear shifter 52 in the second speed engaging position (pre-shift to the second speed gear) and then applies the first clutch 41, releasing the brake mechanism 61 with the second clutch 42 applied partially. The degree of application of the second clutch 42 is controlled by the control unit 2 depending upon a required driving force, a reduction ratio of the second speed gear and the balance in rotational speed of the engine 6. Note that since the first clutch 41 is applied while the brake mechanism 61 is released, part of the power of the engine 6 is used for regeneration of electric energy by the motor 7. As a result, the battery 3 is charged.

After step S109, the control unit 2 determines whether of not the temperature TCL2 of the second clutch 42 is equal to or smaller than a first threshold Tht1 (step S111). If the temperature TCL2 of the second clutch 42 is determined to be equal to or smaller than the first threshold Tht1 (TCL2≤Tht1) as a result of the determination in step S111, the flow returns to step S109, whereas if the temperature TCL2 is larger than the first threshold Tht1 (TCL2>Tht1), the flow proceeds to step S113. In step S113, the control unit 2 determines whether or not the temperature TCL2 of the second clutch 42 is equal to or smaller than a second threshold value Th2. The value of the second threshold Tht2 is higher than that of the first threshold Tht1. If the temperature TCL2 of the second clutch 42 is determined to be larger than the second threshold Tht2 as a result of the determination in step S113 (TCL2>Tht2), the flow proceeds to step S115.

In step S115, the control unit 2 controls so that a warning sound is outputted from a loud speaker, not shown, or a warning message is displayed on a display, not shown, with a view to informing the driver of the vehicle that the second clutch 42 is heated. In addition, the control unit 2 controls so that the second clutch 42 is cooled.

(Second Exemplary Control)

Figure 9:
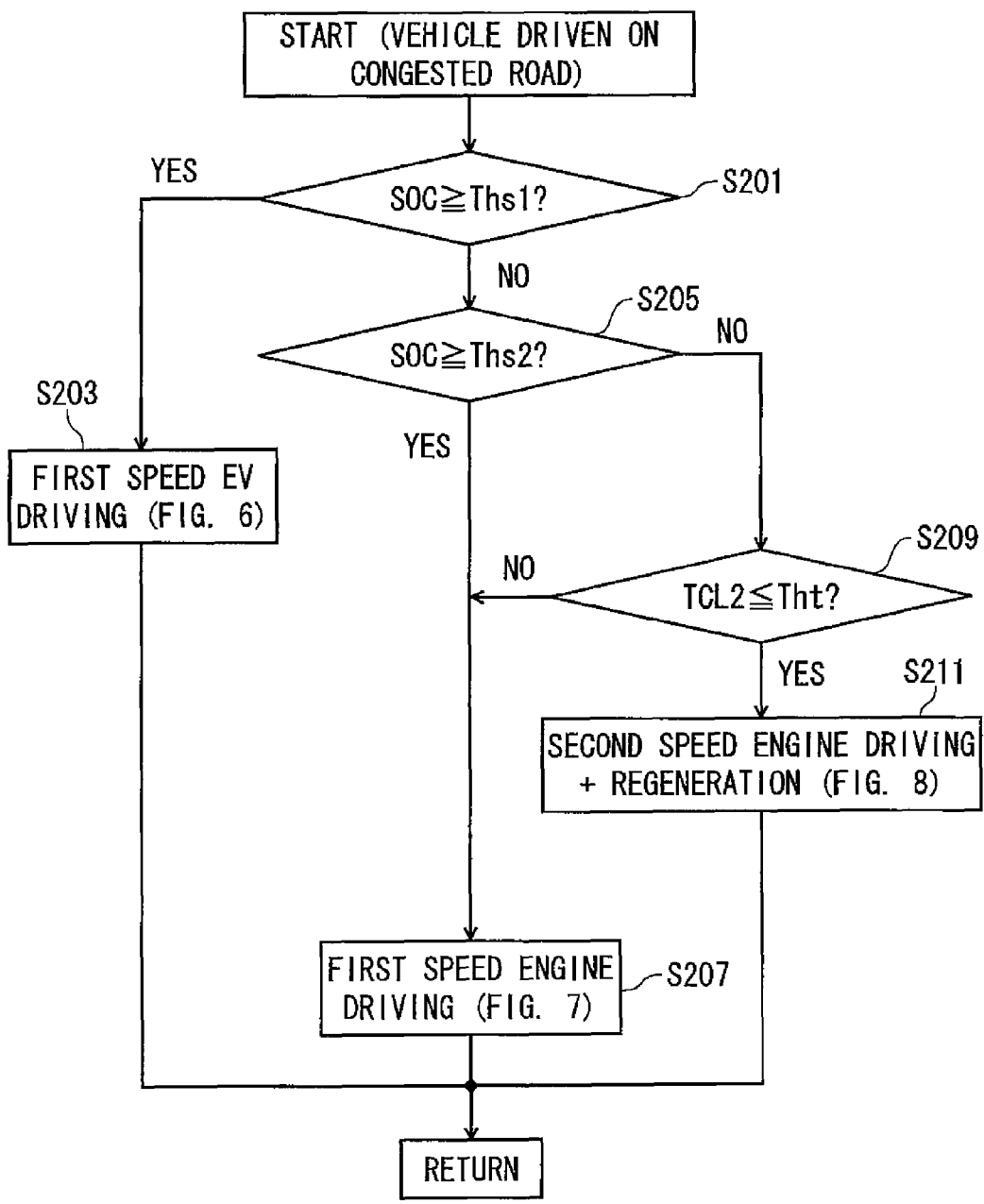
FIG. 9 is a flowchart of a second exemplary control that is executed by the control unit 2 of the vehicle that is being driven at extremely low speeds.

FIG. 9 is a flowchart of a second exemplary control that is executed by the control unit 2 of the vehicle that is driven at extremely low speeds. As shown in FIG. 9, when determining that the vehicle is being driven on a congested road with a heavy traffic, the control unit 2 determines whether or not the SOC of the battery 3 is equal to or larger than a first threshold Ths1 (step S201). The first threshold Ths1 is, for example, the lowest value of the zone A-H shown in FIG. 4. If the SOC of the battery 3 is determined to be equal to or larger than the first threshold Ths1 (SOC≥Ths1) as a result of the determination made in step S201, the flow of the flowchart proceeds to step S203, whereas if the SOC of the battery 3 is smaller than the first threshold Ths1 (SOC<Ths1), the flow proceeds to step S205.

In step S203, the control unit 2 drives the transmission 20 and the motor 7 so that the vehicle is driven in the first speed EV driving. A power transmission line that occurs then in the transmission 20 is such as shown in FIG. 6. On the other hand, in step S205, the control unit 2 determines whether or not the SOC of the battery 3 is equal to or larger than a second threshold Ths2. The second threshold Ths2 is, for example, a maximum value of the zone B shown in FIG. 4. If the SOC of the battery 3 is determined to be equal to or larger than the second threshold Ths2 (SOC≥Ths2) as a result of the determination made in step S205, the flow proceeds to step S207, whereas if the SOC of the battery 3 is smaller than the second threshold Ths2 (SOC<Ths2), the flow proceeds to step S209.

In step S207, the control unit 2 drives the transmission 20 and the engine 6 so that the vehicle is driven in the first speed engine driving. A power transmission line that occurs then in the transmission 20 is such as shown in FIG. 7. On the other hand, in step S209, the control unit 2 determines whether of not the temperature TCL2 of the second clutch 42 is equal to or smaller than a threshold Tht. If the temperature TCL2 of the second clutch 42 is determined to be equal to or smaller than the threshold Tht (TCL2≤Tht) as a result of the determination made in step S209, the flow proceeds to step S211, whereas if the temperature TCL2 is larger than the threshold Tht (TCL2>Tht), the flow proceeds to step S207. In step S211, the control unit 2 drives the transmission 20 and the engine 6 so that the vehicle is driven in the second speed engine driving. A power transmission line that occurs then in the transmission 20 is such as shown in FIG. 8.

(Third Exemplary Control)

Figure 10:
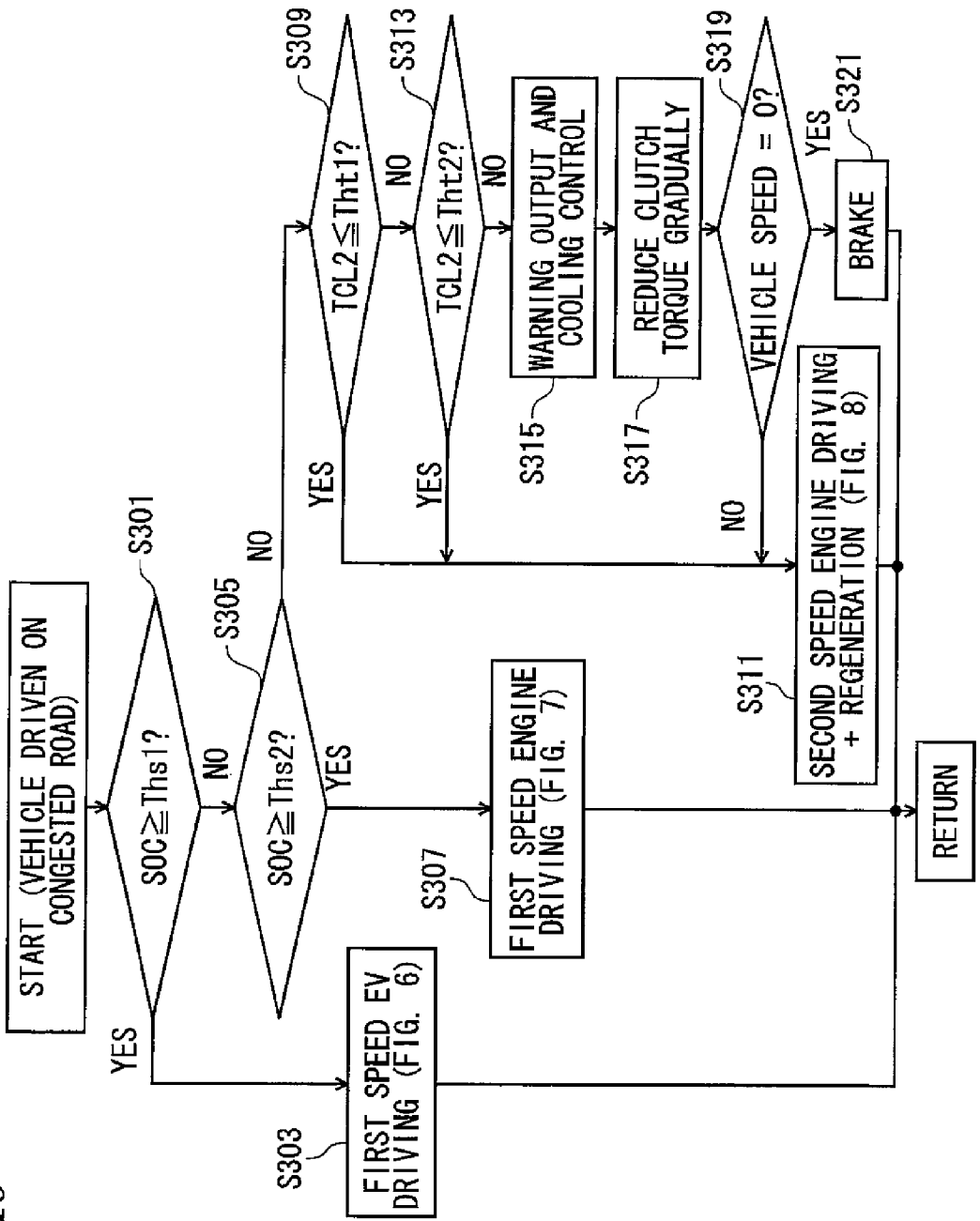
FIG. 10 is a flowchart of a third exemplary control that is executed by the control unit 2 of the vehicle that is being driven at extremely low speeds.

FIG. 10 is a flowchart of a third exemplary control that is executed by the control unit 2 of the vehicle that is driven at extremely low speeds. As shown in FIG. 10, when determining that the vehicle is being driven on a congested road with a heavy traffic, the control unit 2 determines whether or not the SOC of the battery 3 is equal to or larger than a first threshold Ths1 (step S301). The first threshold Ths1 is, for example, the lowest value of the zone A-H shown in FIG. 4. If the SOC of the battery 3 is determined to be equal to or larger than the first threshold Ths1 (SOC≥Ths1) as a result of the determination made in step S301, the flow of the flowchart proceeds to step S303, whereas if the SOC of the battery 3 is smaller than the first threshold Ths1 (SOC<Ths1), the flow proceeds to step S305.

In step S303, the control unit 2 drives the transmission 20 and the motor 7 so that the vehicle is driven in the first speed EV driving. A power transmission line that occurs then in the transmission 20 is such as shown in FIG. 6. On the other hand, in step S305, the control unit 2 determines whether or not the SOC of the battery 3 is equal to or larger than a second threshold Ths2. The second threshold Ths2 is, for example, the maximum value of the zone B shown in FIG. 4. If the SOC of the battery 3 is determined to be equal to or larger than the second threshold (SOC≥Ths2) as a result of the determination made in step S305, the flow proceeds to step S307, whereas if the SOC of the battery 3 is smaller than the second threshold (SOC<Ths2), the flow proceeds to step S309.

In step S307, the control unit 2 drives the transmission 20 and the engine 6 so that the vehicle is driven in the first speed engine driving. A power transmission line that occurs then in the transmission 20 is such as shown in FIG. 7. On the other hand, in step S309, the control unit 2 determines whether of not the temperature TCL2 of the second clutch 42 is equal to or smaller than a first threshold Tht1. If the temperature TCL2 of the second clutch 42 is determined to be equal to or smaller than the first threshold Tht1 (TCL2≤Tht1) as a result of the determination in step S309, the flow proceeds to step S311, whereas if the temperature TCL2 is larger than the first threshold Tht1 (TCL2>Tht1), the flow proceeds to step S313. In step S311, the control unit 2 drives the transmission 20 and the engine 6 so that the vehicle is driven in the second speed engine driving. A power transmission line that occurs then in the transmission 20 is such as shown in FIG. 8.

In step S313, the control unit 2 determines whether or not the temperature TCL2 of the second clutch 42 is equal to or smaller than a second threshold Tht2. The value of the second threshold Tht2 is higher than that of the first threshold Tht1. If the temperature TCL2 of the second clutch 42 is determined to be equal to or smaller than the second threshold Tht2 (TCL2≤Tht2) as a result of the determination made in step S313, the flow proceeds to step S311, whereas if the temperature TCL2 is larger than the second threshold Tht2 (TCL2>Tht2), the flow proceeds to step S315.

In step S315, the control unit 2 controls so that a warning sound is outputted from a loud speaker, not shown, or a warning message is displayed on a display, not shown, with a view to informing the driver of the vehicle that the second clutch 42 is heated. In addition, the control unit 2 controls so that the second clutch 42 is cooled. Next, the control unit 2 gradually reduces clutch torque at the first and second clutches 41, 42 of the transmission 20 (step S317). Next, the control unit 2 determines whether or not the vehicle speed is zero (step S319), and if the vehicle speed is zero, the flow proceeds to step S321, whereas if the vehicle speed is not zero, the flow proceeds to step S311. In step S321, the control unit 2 applies the brakes to slow the vehicle.

(Fourth Exemplary Control)

Figure 11:
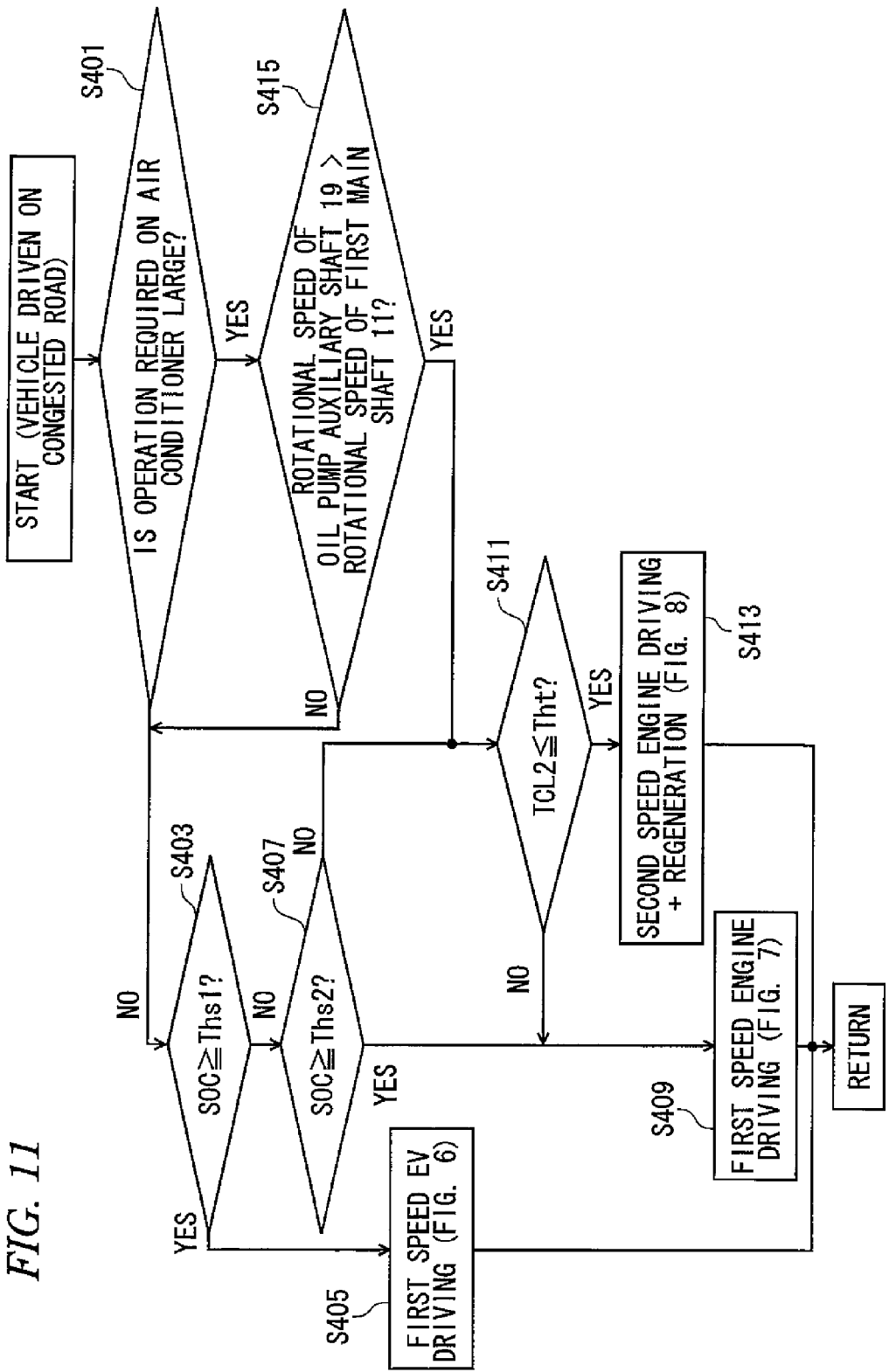
FIG. 11 is a flowchart of a fourth exemplary control that is executed by the control unit 2 of the vehicle that is being driven at extremely low speeds.

FIG. 11 is a flowchart of a fourth exemplary control that is executed by the control unit 2 of the vehicle that is driven at extremely low speeds. As shown in FIG. 5, when determining that the vehicle is being driven on a congested road with a heavy traffic, the control unit 2 determines whether or not an operation required on the air conditioner is large based on the state of the air conditioner switch (step S401). If the operation required on the air conditioner is determined to be small as a result of the determination made in step S401, the flow proceeds to step S403.

In step S403, the control unit 2 determines whether or not the SOC of the battery 3 is equal to or larger than a first threshold Ths1. The first threshold Ths1 is, for example, the lowest value of the zone A-H shown in FIG. 4. If the SOC of the battery 3 is determined to be equal to or larger than the first threshold Ths1 (SOC≥Ths1) as a result of the determination made in step S403, the flow proceeds to step S405, whereas if the SOC is smaller than the first threshold Ths1 (SOC<Ths1), the flow proceeds to step S407.

In step S405, the control unit 2 drives the transmission 20 and the motor 7 so that the vehicle is driven in the first speed EV driving. A power transmission line that occurs then in the transmission 20 is such as shown in FIG. 6. On the other hand, in step S407, the control unit 2 determines whether or not the SOC of the battery 3 is equal to or larger than a second threshold Ths2. The second threshold Ths2 is, for example, the maximum value of the zone B shown in FIG. 4. If the SOC of the battery 3 is determined to be equal to or larger than the second threshold Ths2 (SOC≥Ths2) as a result of the determination made in step S407, the flow proceeds to step S409, whereas if the SOC is smaller than the second threshold Ths2 (SOC<Ths2), the flow proceeds to step S411.

In step S409, the control unit 2 drives the transmission 20 and the engine 6 so that the vehicle is driven in the first speed engine driving. A power transmission line that occurs then in the transmission 20 is such as shown in FIG. 7. On the other hand, in step S411, the control unit 2 determines whether or not the temperature TCL2 of the second clutch 42 is equal to or smaller than a threshold Tht. If the temperature TCL2 of the second clutch 42 is determined to be equal to or smaller than the threshold Tht (TCL2≤Tht) as a result of the determination made in step S411, the flow proceeds to step S413, whereas if the temperature TCL2 is larger than the threshold Tht (TCL2>Tht), the flow proceeds to step S409. In step S413, the control unit 2 drives the transmission 20 and the engine 6 so that the vehicle is driven in the second speed engine driving. A power transmission line that occurs then in the transmission 20 is such as shown in FIG. 8.

If the operation required on the air conditioner is determined to be large as a result of the determination made in step S401, the flow proceeds to step S415. In step S415, the control unit 2 determines whether or not a required rotational speed of the oil pump auxiliary shaft 19 of the transmission 20 based on the operation required on the air conditioner is equal to or larger than the rotational speed of the first main shaft 11 that is being rotated by the engine 6. If the required rotational speed of the oil pump auxiliary shaft 19 is determined to be equal to or larger than the rotational speed of the first main shaft 11 as a result of the determination made in step S415, the flow proceeds to step S411, whereas if the required rotational speed of the oil pump auxiliary shaft 19 is smaller than the rotational speed of the first main shaft 11, the flow proceeds to step S403.

When the vehicle is driven in the second speed engine driving that is described in step S413 as a result of the flow proceeding to step S411 by way of step S415, the control unit 2 controls the rotational speed of the engine 6 so that the rotational speed of the oil pump auxiliary shaft 19 coincides with the required rotational speed thereof.

Thus, according to this embodiment, when the hybrid vehicle is driven at extremely low speeds, the appropriate driving forms can be selected depending upon the SOC of the battery 3 or the operation required on the air conditioner and the temperature of the second clutch 42 of the transmission 20.

When the vehicle is creeping, the vehicle speed is set such that the engine 6 can be started by the driving force of the motor 7 when the driving form is changed from the EV driving to the first speed engine driving.

The invention is not limited to the embodiment that has been described heretofore, and hence, the invention can be modified or improved as required.

For example, in the transmission 20, the odd-numbered gears are disposed on the first main shaft 11 that is the input shaft to which the motor 7 of the dual-clutch transmission is connected, whereas the even-numbered gears are disposed on the second intermediate shaft 16 that is the input shaft to which the motor 7 is not connected. However, the invention is not limited to that configuration, and hence, the even-numbered gears may be disposed on the first main shaft 11 that is the input shaft to which the motor 7 is connected, whereas the odd-numbered gears may be disposed on the second intermediate shaft 16 that is the input shaft to which the motor 7 is not connected.

The driven gears that are mounted on the counter shaft 14 are the first common driven gear 23b that commonly meshes with the second speed drive gear 22a and the third speed drive gear 23a and the second common driven gear 24b that commonly meshes with the fourth speed drive gear 24a and the fifth speed drive gear 25a. However, the invention is not limited to this configuration, and hence, a plurality of driven gears may be provided which mesh with the individual gears. The planetary gear mechanism 30 is illustrated as the first speed drive gear. However, the invention is not limited thereto, and hence, as with the third speed drive gear 23a, a first speed drive gear may be provided.

Figure 12:
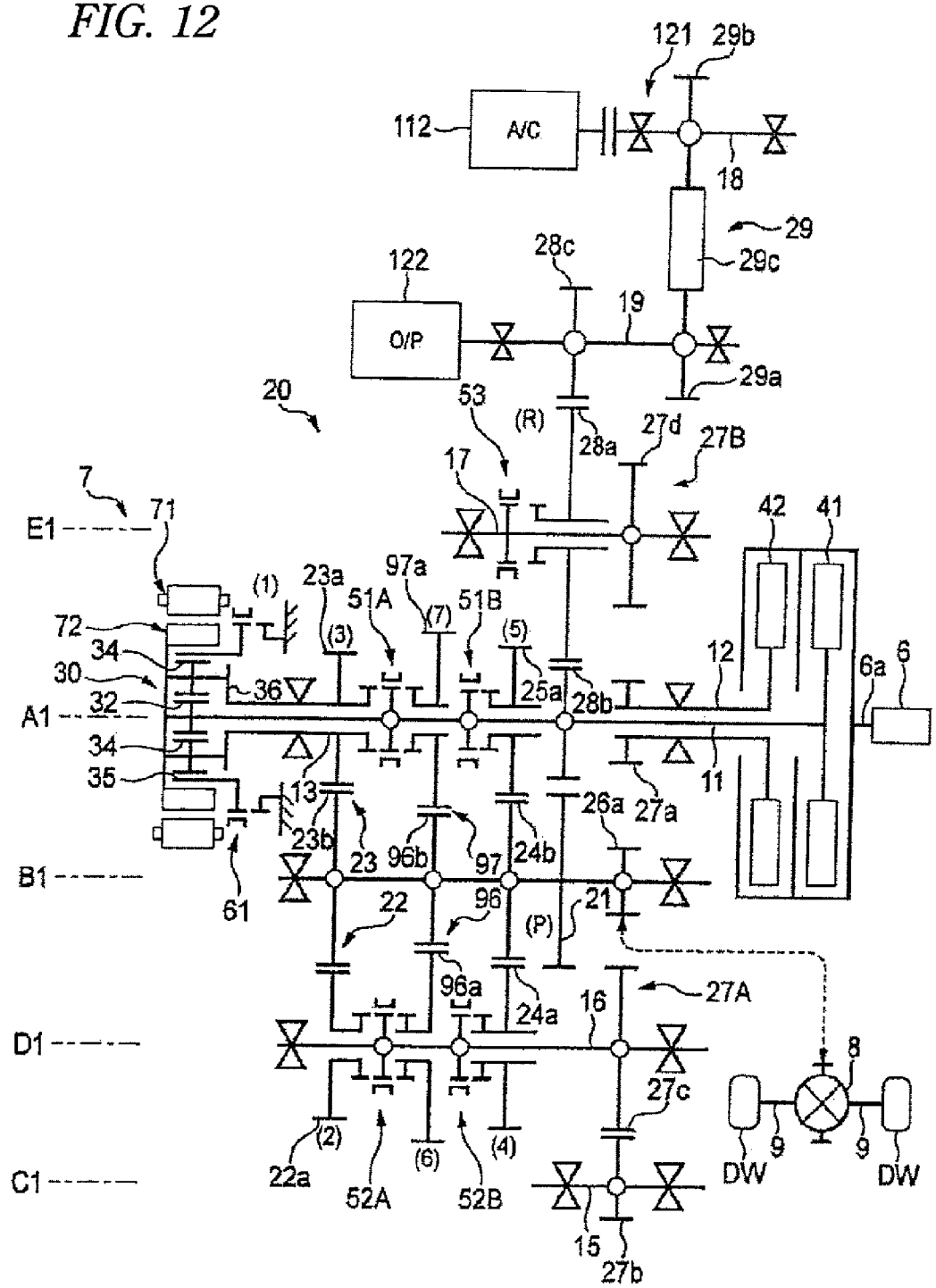
FIG. 12 conceptually shows interior configurations of the motor 7 and a transmission 20 having a sixth speed drive gear and a seventh speed drive gear.

As odd-numbered change-speed gears, in addition to the planetary gear mechanism 30 as the first speed drive gear, the third speed drive gear 23a and the fifth speed drive gear 25a, seventh speed drive gear, ninth speed drive gear, and the like may be provided. As even-numbered change-speed gears, in addition to the second speed drive gear 22a and the fourth speed drive gear 24a, sixth speed drive gear, eighth speed drive gear and the like may be provided. In an example of a configuration shown in FIG. 12, a seventh speed drive gear 97a is provided further on the first main shaft 11, a sixth speed drive gear 96a is provided further on the second intermediate shaft 16, and a third common driven gear 96b is provided further on the counter shaft 14, the third common driven gear 96b meshing with the seventh speed drive gear 97a to make up a seventh speed gear pair 97 and meshing with the sixth speed drive gear 96a to make up a sixth speed gear pair 26. In FIG. 8, reference numeral 51A denotes a gear shifter which connects or disconnects the first main shaft 11 with or from the third speed drive gear 23a or the seventh speed drive gear 97a. Reference numeral 51B denotes a gear shifter 51B which connects or disconnects the first main shaft 11 with or from the fifth speed drive gear 25a. Reference numeral 52A denotes a gear shifter 52A which connects or disconnects the second intermediate shaft 16 with or from the second speed drive gear 22a or the sixth speed drive gear 96a. Reference numeral 52B denotes a gear shifter which connects or disconnects the second intermediate shaft 16 with or from the fourth speed drive gear 24a.

While the invention has been described by reference to the specific embodiment, it is obvious to the skilled person that various alterations or modifications can be made to the embodiment without departing from the spirit and scope of the invention.

This patent application is based on Japanese Patent Application (No. 2010-157984) filed on Jul. 12, 2010, the contents of which are incorporated herein by reference.

DESCRIPTION OF REFERENCE NUMERALS AND CHARACTERS

2 Control unit
3 Battery
6 Engine (Internal combustion engine)
7 Motor (Electric motor)
8 Differential gear mechanism
9 Drive shaft
DW Drive wheel
11 First main shaft (First input shaft)
12 Second main shaft
13 Connecting shaft
14 Counter shaft (Output shaft)
15 First intermediate shaft
16 Second intermediate shaft (Second input shaft)
17 Reverse shaft
18 Air conditioner auxiliary shaft
19 Oil pump auxiliary shaft
20 Transmission
22a Second speed drive gear
23a Third speed drive gear
23b First common driven gear 24a Fourth speed drive gear
24b Second common driven gear
25a Fifth speed drive gear
28 Reverse gear train
28a Reverse drive gear
28b Reverse driven gear
28c Oil pump driven gear
29 Air conditioner transmission mechanism
29a Air conditioner drive gear
29b Air conditioner drive gear
29c Chain
30 Planetary gear mechanism
41 First clutch (First engaging and disengaging mechanism)
42 Second clutch (Second engaging and disengaging mechanism)
51 First gear shifter (First synchronizing unit)
52 Second gear shifter (Second synchronizing unit)
53 Reverse shifter
61 Brake mechanism (Synchronizer mechanism)
101 Inverter; WS Wheel speed sensor;
121 Air conditioner clutch
122 Oil pump
112 Air conditioner compressor.

The invention claimed is:

1. A control unit for a hybrid vehicle having an internal combustion engine and an electric motor as drive sources, the hybrid vehicle including:
a transmission including:
a first transmission mechanism in which mechanical power from an engine output shaft of the internal combustion engine and the electric motor is borne by a first input shaft that engages with the electric motor and any one of a plurality of change-speed gears is engaged via a first synchronizing unit so that the first input shaft is brought into engagement with driven wheels of the hybrid vehicle;
a second transmission mechanism in which mechanical power from the engine output shaft is borne by a second input shaft and any of a plurality of change-speed gears is engaged via a second synchronizing unit so that the second input shaft is brought into engagement with the driven wheels;
a first engaging and disengaging mechanism that is provided so as to correspond to the first transmission mechanism for engaging the engine output shaft with the first input shaft; and
a second engaging and disengaging mechanism that is provided so as to correspond to the second transmission mechanism for engaging the engine output shaft with the second input shaft; and
an air conditioner compressor that is connected to the first input shaft via an air conditioner clutch,
wherein the control unit controls the transmission so that with the hybrid vehicle driven at extremely low speeds only by power from the electric motor, when a state-of-charge of a battery that supplies electric power to the electric motor becomes equal to or smaller than a first charged level or when a rotational speed required on the air conditioner compressor is less than a desired rotational speed, power from the internal combustion engine is transmitted to an output shaft to drive the hybrid vehicle with the internal combustion engine by engaging the first engaging and disengaging mechanism, starting the internal combustion engine by power from the electric motor, and thereafter, engaging the first engaging and disengaging mechanism or the second engaging and disengaging mechanism between a fully applied state and a fully released state.

2. The control unit of claim 1 wherein the air conditioner compressor operates based on electric power from the battery.

3. The control unit of claim 1,
wherein, when the hybrid vehicle is driven at extremely low speeds by power from the internal combustion engine, an engagement state of the first engaging and disengaging mechanism or the second engaging and disengaging mechanism between the fully applied state and the fully released state is determined according to a deviation between an output of the internal combustion engine and an output that is required on a driven part.

4. The control unit of claim 1,
wherein, when the state-of-charge of the battery becomes equal to or smaller than a second charged level which is lower than the first charged level, power from the internal combustion engine is transmitted to the output shaft via the second synchronizing unit by engaging the second engaging and disengaging mechanism between the fully applied state and the fully released state, releasing the first synchronizing unit, and engaging the first engaging and disengaging mechanism.

5. The control unit of claim 1,
wherein, when a temperature of the second engaging and disengaging mechanism exceeds a threshold, power from the internal combustion engine is transmitted to the output shaft via the first synchronizing unit by engaging the first engaging and disengaging mechanism between the fully applied state and the fully released state, and disengaging the second engaging and disengaging mechanism.

6. The control unit of claim 1,
wherein, when a temperature of the second engaging and disengaging mechanism exceeds the threshold, a cooling control is executed to reduce the temperature of the second engaging and disengaging mechanism.

7. The control unit of claim 6,
wherein, in the cooling control, information is given to the driver of the hybrid vehicle.

8. The control unit of claim 6,
wherein, in the cooling control, the second engaging and disengaging mechanism is made close to the fully released state, and a brake of the vehicle is applied when the hybrid vehicle stops driving.

9. The control unit of claim 1,
wherein, when the hybrid vehicle is creeping, a vehicle speed is set such that the internal combustion engine can be started by power of the electric motor when a driving form of the hybrid vehicle is changed from a driving form in which the hybrid vehicle is driven only by power from the electric motor to a driving form in which the hybrid vehicle is driven by power from the internal combustion engine.

10. The control unit of claim 1,
wherein, when the internal combustion engine is started by power from the electric motor, the first engaging and disengaging mechanism is engaged while the first synchronizing unit is released.

11. The control unit of any one of claims 1 to 10,
wherein, the transmission are controlled so that power from the internal combustion engine is transmitted to the output shaft via the second synchronizing unit by engaging the second engaging and disengaging mechanism between the fully applied state and the fully released state, and so that, when the state-of-charge of the battery exceeds the first charged level in a state where the first engaging and disengaging mechanism is engaged while the first synchronizing unit is released, power of the electric motor is transmitted to the output shaft by disengaging the first engaging and disengaging mechanism and the second engaging and disengaging mechanism.

12. A control unit for a hybrid vehicle having an internal combustion engine and an electric motor as drive sources, the hybrid vehicle including:
a transmission including:
a first transmission mechanism in which mechanical power from an engine output shaft of the internal combustion engine and the electric motor is borne by a first input shaft that engages with the electric motor and any one of a plurality of change-speed gears is engaged via a first synchronizing unit so that the first input shaft is brought into engagement with driven wheels of the hybrid vehicle;
a second transmission mechanism in which mechanical power from the engine output shaft is borne by a second input shaft and any of a plurality of change-speed gears is engaged via a second synchronizing unit so that the second input shaft is brought into engagement with the driven wheels;
a first engaging and disengaging mechanism that is provided so as to correspond to the first transmission mechanism for engaging the engine output shaft with the first input shaft; and
a second engaging and disengaging mechanism that is provided so as to correspond to the second transmission mechanism for engaging the engine output shaft with the second input shaft,
wherein the control unit controls the transmission so that with the hybrid vehicle driven at extremely low speeds only by power from the electric motor, when a state-of-charge of a battery that supplies electric power to the electric motor becomes equal to or smaller than a first charged level, power from the internal combustion engine is transmitted to an output shaft to drive the hybrid vehicle with the internal combustion engine by engaging the first engaging and disengaging mechanism, starting the internal combustion engine by power from the electric motor, and thereafter, engaging the first engaging and disengaging mechanism or the second engaging and disengaging mechanism between a fully applied state and a fully released state.

13. A control method for a hybrid vehicle having an internal combustion engine and an electric motor as drive sources, the control method including:
preparing the hybrid vehicle which includes a transmission including:
a first transmission mechanism in which mechanical power from an engine output shaft of the internal combustion engine and the electric motor is borne by a first input shaft that engages with the electric motor and any one of a plurality of change-speed gears is engaged via a first synchronizing unit so that the first input shaft is brought into engagement with driven wheels of the hybrid vehicle;
a second transmission mechanism in which mechanical power from the engine output shaft is borne by a second input shaft and any of a plurality of change-speed gears is engaged via a second synchronizing unit so that the second input shaft is brought into engagement with the driven wheels;
a first engaging and disengaging mechanism that is provided so as to correspond to the first transmission mechanism for engaging the engine output shaft with the first input shaft; and
a second engaging and disengaging mechanism that is provided so as to correspond to the second transmission mechanism for engaging the engine output shaft with the second input shaft;
an air conditioner compressor that is connected to the first input shaft via an air conditioner clutch; and
a control unit for controlling the internal combustion engine, the electric motor and the transmission; and
controlling, using the control unit, the transmission so that with the hybrid vehicle driven at extremely low speeds only by power from the electric motor, when a state-of-charge of a battery that supplies electric power to the electric motor becomes equal to or smaller than a first charged level or when a rotational speed required on the air conditioner compressor is less than a desired rotational speed, power from the internal combustion engine is transmitted to an output shaft to drive the hybrid vehicle with the internal combustion engine by engaging the first engaging and disengaging mechanism, starting the internal combustion engine by power from the electric motor, and thereafter, engaging the first engaging and disengaging mechanism or the second engaging and disengaging mechanism between a fully applied state and a fully released state.

14. The control method of claim 13 wherein the air conditioner compressor operates based on electric power from the battery.

15. A control method for a hybrid vehicle having an internal combustion engine and an electric motor as drive sources, the control method including:
preparing the hybrid vehicle which includes a transmission including:
a first transmission mechanism in which mechanical power from an engine output shaft of the internal combustion engine and the electric motor is borne by a first input shaft that engages with the electric motor and any one of a plurality of change-speed gears is engaged via a first synchronizing unit so that the first input shaft is brought into engagement with driven wheels of the hybrid vehicle;
a second transmission mechanism in which mechanical power from the engine output shaft is borne by a second input shaft and any of a plurality of change-speed gears is engaged via a second synchronizing unit so that the second input shaft is brought into engagement with the driven wheels;
a first engaging and disengaging mechanism that is provided so as to correspond to the first transmission mechanism for engaging the engine output shaft with the first input shaft; and
a second engaging and disengaging mechanism that is provided so as to correspond to the second transmission mechanism for engaging the engine output shaft with the second input shaft; and
a control unit for controlling the internal combustion engine, the electric motor and the transmission; and
controlling, using the control unit, the transmission so that with the hybrid vehicle driven at extremely low speeds only by power from the electric motor, when a state-of-charge of a battery that supplies electric power to the electric motor becomes equal to or smaller than a first charged level, power from the internal combustion engine is transmitted to an output shaft to drive the hybrid vehicle with the internal combustion engine by engaging the first engaging and disengaging mechanism, starting the internal combustion engine by power from the electric motor, and thereafter, engaging the first engaging and disengaging mechanism or the second engaging and disengaging mechanism between a fully applied state and a fully released state.

16. The control unit of claim 5,
wherein, when a temperature of the second engaging and disengaging mechanism exceeds the threshold, a cooling control is executed to reduce the temperature of the second engaging and disengaging mechanism.

17. The control unit of claim 9,
wherein, when the internal combustion engine is started by power from the electric motor, the first engaging and disengaging mechanism is engaged while the first synchronizing unit is released.

18. The control unit of claim 12,
wherein, when the hybrid vehicle is driven at extremely low speeds by power from the internal combustion engine, an engagement state of the first engaging and disengaging mechanism or the second engaging and disengaging mechanism between the fully applied state and the fully released state is determined according to a deviation between an output of the internal combustion engine and an output that is required on a driven part.

19. The control unit of claim 12,
wherein, when the state-of-charge of the battery becomes equal to or smaller than a second charged level which is lower than the first charged level, power from the internal combustion engine is transmitted to the output shaft via the second synchronizing unit by engaging the second engaging and disengaging mechanism between the fully applied state and the fully released state, releasing the first synchronizing unit, and engaging the first engaging and disengaging mechanism.

20. The control unit of claim 12,
wherein, when a temperature of the second engaging and disengaging mechanism exceeds a threshold, power from the internal combustion engine is transmitted to the output shaft via the first synchronizing unit by engaging the first engaging and disengaging mechanism between the fully applied state and the fully released state, and disengaging the second engaging and disengaging mechanism.

21. The control unit of claim 12,
wherein, when a temperature of the second engaging and disengaging mechanism exceeds the threshold, a cooling control is executed to reduce the temperature of the second engaging and disengaging mechanism.

22. The control unit of claim 12,
wherein, in the cooling control, information is given to the driver of the hybrid vehicle.

23. The control unit of claim 21,
wherein, in the cooling control, the second engaging and disengaging mechanism is made close to the fully released state, and the control unit is driven when the hybrid vehicle stops driving.

24. The control unit of claim 12,
wherein, when the hybrid vehicle is creeping, a vehicle speed is set such that the internal combustion engine can be started by power of the electric motor when a driving form of the hybrid vehicle is changed from a driving form in which the hybrid vehicle is driven only by power from the electric motor to a driving form in which the hybrid vehicle is driven by power from the internal combustion engine.

25. The control unit of claim 12,
wherein, when the internal combustion engine is started by power from the electric motor, the first engaging and disengaging mechanism is engaged while the first synchronizing unit is released.

26. The control unit of any one of claims 12 and 18 to 25,
wherein, the transmission are controlled so that power from the internal combustion engine is transmitted to the output shaft via the second synchronizing unit by engaging the second engaging and disengaging mechanism between the fully applied state and the fully released state, and so that, when the state-of-charge of the battery exceeds the first charged level in a state where the first engaging and disengaging mechanism is engaged while the first synchronizing unit is released, power of the electric motor is transmitted to the output shaft by disengaging the first engaging and disengaging mechanism and the second engaging and disengaging mechanism.

27. The control unit of claim 20,
wherein, when a temperature of the second engaging and disengaging mechanism exceeds the threshold, a cooling control is executed to reduce the temperature of the second engaging and disengaging mechanism.

28. The control unit of claim 24,
wherein, when the internal combustion engine is started by power from the electric motor, the first engaging and disengaging mechanism is engaged while the first synchronizing unit is released.

* * * * *